US012744197B2

(12) United States Patent
Stewart et al.

(10) Patent No.: US 12,744,197 B2
(45) Date of Patent: Sep. 22, 2026

(54) METHOD OF OPERATING A MULTIPOLE DEVICE

(71) Applicant: Thermo Fisher Scientific (Bremen) GmbH, Bremen (DE)

(72) Inventors: Hamish Stewart, Bremen (DE); Amelia Corinne Peterson, Bremen (DE); Alexander A. Makarov, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 289 days.

(21) Appl. No.: 18/670,505

(22) Filed: May 21, 2024

(65) Prior Publication Data

US 2024/0395533 A1 Nov. 28, 2024

(30) Foreign Application Priority Data

May 23, 2023 (GB) ..................................... 2307690

(51) Int. Cl.
*H01J 49/42* (2006.01)
*H01J 49/00* (2006.01)
*H01J 49/02* (2006.01)

(52) U.S. Cl.
CPC ...... *H01J 49/4215* (2013.01); *H01J 49/0031* (2013.01); *H01J 49/022* (2013.01)

(58) Field of Classification Search
CPC .. H01J 49/022; H01J 49/0027; H01J 49/0031; H01J 49/4215
See application file for complete search history.

(56) References Cited

U.S. PATENT DOCUMENTS

| | | | | |
|---|---|---|---|---|
| 7,211,788 | B2 | 5/2007 | Marriott | |
| 7,351,962 | B2 | 4/2008 | Kalinitchenko | |
| RE45,553 | E | 6/2015 | Marriott | |
| 9,373,487 | B2 * | 6/2016 | Fujita | H01J 49/022 |
| 10,832,900 | B2 | 11/2020 | Green et al. | |
| 11,062,895 | B2 * | 7/2021 | Peterson | H01J 49/4215 |

(Continued)

FOREIGN PATENT DOCUMENTS

| | | | |
|---|---|---|---|
| GB | 2583092 | A | 10/2020 |
| WO | 2013171313 | A1 | 11/2013 |

OTHER PUBLICATIONS

Examination Report for related Application No. GB 2307690.4, 5 pages, mailed Nov. 14, 2023.

*Primary Examiner* — David E Smith
(74) *Attorney, Agent, or Firm* — Klarquist Sparkman, LLP

(57) ABSTRACT

A method of operating a multipole device comprises sorting a list of mass-to-charge ratios that are assigned to one of first and second polarity configurations to be applied between first and second pairs of opposing electrodes, the first polarity configuration being a first polarity DC offset and the second polarity configuration being a second, opposite polarity DC offset; and based on the sorting, operating the multipole device for a first time duration according to the first polarity configuration to select ions having mass-to-charge ratios from the list that are assigned to the first polarity configuration and operating the multipole device for a second, distinct time duration according to the second polarity configuration to select ions having mass-to-charge ratios from the list that are assigned to the second polarity configuration.

26 Claims, 7 Drawing Sheets

(56) References Cited

U.S. PATENT DOCUMENTS

| | | | | |
|---|---|---|---|---|
| 2003/0001088 | A1 | 1/2003 | Bateman et al. | |
| 2015/0028197 | A1 | 1/2015 | Grinfeld et al. | |
| 2017/0122906 | A1 | 5/2017 | Mann et al. | |
| 2018/0174817 | A1 | 6/2018 | Green et al. | |
| 2021/0249250 | A1* | 8/2021 | Maeda | H01J 49/4215 |

* cited by examiner

Single Polarity

Switched Polarity

METHOD OF OPERATING A MULTIPOLE DEVICE

CROSS REFERENCE TO RELATED APPLICATION

This application claims priority from application GB 2307690.4, filed May 23, 2023. The entire disclosure of application GB 2307690.4 is incorporated herein by reference.

FIELD

The disclosure relates generally to the field of mass spectrometry. More particularly, the disclosure relates to a method of operating a multipole device, and an analytical instrument comprising a multipole device.

BACKGROUND

Tandem mass spectrometric methods typically isolate precursor ions out of a wider mass range for fragmentation and subsequent measurement in a downstream mass analyser. Most commonly, a resolving quadrupole is used to perform isolation, due to its relatively simple design and good performance. High performance of the quadrupole requires high field precision and consequently, high mechanical accuracy. The mechanical accuracy typically is desirably within a few microns for the quadrupole rods, and should be similar for the overall assembly. Inaccuracy may result in transmission losses, and other inconsistencies in mass filter window width.

A major problem with quadrupole mass filters is that filtered ions are deposited onto the quadrupole rods, eventually forming layers of contamination that can screen ions from the rod potential, and these contamination layers can accumulate charge. Such charging perturbs the quadrupolar field, and the contamination is distributed unevenly along the length and radius of the rods. This greatly reduces the field accuracy and the filtering properties of an analytical instrument. Most typically, this is observed as a reduction in transmission for any pre-set filter window. As different mass-to-charge ratio (m/z) ions have differing energies and trajectories, the effect is non-uniform. Furthermore, ion charging means that the effect may change even over the course of a day. Such contamination may be removed by cleaning the rods, but this takes time and may not be straightforward to perform.

One method to reduce the contamination load on the mass filter is to precede the main mass filter with another filtering section (a pre-filter), which absorbs most of the contamination before the ion beam reaches the fine filter rods. The pre-filter operates with a wider mass window and thus has greater tolerance for contamination. This may be a separate device, as described in U.S. Pat. No. 7,211,788 and U.S. RE45,553. However, a separate pre-filter does not sufficiently reduce contamination and itself requires cleaning.

Otherwise, the pre-filter may be an additional segment of the quadrupole assembly as described in US 2018/0174817 and U.S. Pat. No. 10,832,900. However, additional pre-filtering segments may cause engineering challenges for construction and appropriately dividing power supplies, without introducing additional delays or instabilities.

Another method is to reduce the impact of contamination on the rods themselves by introducing slots or other surface roughness (for example, as discussed in U.S. Pat. No. 7,351,962), to break up formation of contaminant films. However, slots or roughness perturb the ideal electromagnetic fields, which can reduce performance.

Another method is to accumulate ions in a preceding device, then release ions into the quadrupole in a strongly mass-dependent manner. This limits the spread of ions around the target mass window that require filtering, and also limits transmission losses due to filtration. One example of such pre-accumulation is a Parallel Accumulation Serial Fragmentation (PASEF) method from a trapped ion mobility device, such as described by US 2017/0122906. However, pre-accumulation PASEF-like methods require additional devices with complex control methods and often prohibitive space-charge limits.

U.S. Pat. No. 11,062,895 describes a method of operating a mass spectrometer comprising a quadrupole mass filter, the quadrupole mass filter having four parallel elongate electrodes arranged in opposing pairs. Quadrupole mass selection parameters for filtering ions are encoded into a code and properties of the code, along with a set of rules, are used to determine to which pair of opposing rods an attractive DC voltage is applied and to which pair a repulsive DC voltage is applied. The configuration of the pairs of opposing electrodes, to which the attractive and repulsive DC voltages are applied, is switched multiple times over the course of generating, mass filtering and mass analysing or detecting. Over long-term operation, the contamination build-up on each pair of opposing electrodes is thus substantially equal.

Overcoming the issues noted above is desirable.

SUMMARY

Against this background, there is provided a method of operating a multipole device. Additional aspects appear in the description and claims.

The present disclosure provides a method of operating a multipole device capable of requiring only one polarity switch during an experiment. This may be implemented by grouping m/z values in a precursor list based on a common electrode polarity operation (for instance, a predetermined encoding of m/z with electrode polarity operation). Thus, when operating the multipole device according to one polarity configuration, in which an attractive DC voltage is applied to one pair of opposing electrodes and a repulsive DC voltage is applied to another pair of opposing electrodes, precursors in the list grouped to the one polarity configuration are selected. The polarity of the DC voltages is reversed between the pairs of electrodes, and precursors in the list grouped to the other polarity configuration are selected during a second time duration (which may be before or after the first time duration). In other words, between the first and second time duration, there is a single DC polarity switch. Thus, ions having the m/z values in the list can be selected efficiently with only one polarity switch. Preferably, the list comprises at least three target m/z values (so that there is at least one m/z value in one polarity configuration and at least two m/z values in the other polarity configuration).

This method may be much faster than the method proposed in (for example) U.S. Pat. No. 11,062,895, whilst still being able to achieve the same benefits of reduced contamination of rods. The method can therefore be used in faster analysers (for example, a multi-reflection time-of-flight, MR-ToF, mass analyser) without significantly sacrificing scan time. The method can also be used in slower analysers (for example, analytical instruments comprising orbital trapping mass analysers) without the need to design power supplies capable of faster DC polarity switches, which would require time and skilled engineering. Furthermore, the reduced contamination can be achieved without requiring additional equipment (such as a separate pre-filter) to avoid contamination.

In accordance with a first aspect, there is provided a method of operating a multipole device comprising a first pair of opposing electrodes and a second pair of opposing electrodes, the method comprising:

sorting a list of mass-to-charge ratios that are assigned to one of a first polarity configuration and a second polarity configuration by the assigned polarity configuration, the first polarity configuration being a configuration in which a first polarity DC offset is applied between the first and second pairs of opposing electrodes, and the second polarity configuration being a configuration in which a second, opposite polarity DC offset is applied between the first and second pairs of opposing electrodes; and based on the sorting, operating the multipole device for a first time duration according to the first polarity configuration to select ions having mass-to-charge ratios from the list that are assigned to the first polarity configuration and operating the multipole device for a second time duration, distinct from the first time duration, according to the second polarity configuration to select ions having mass-to-charge ratios from the list that are assigned to the second polarity configuration.

Thus, only one polarity switch may be required to select precursors in a precursor list, whilst still allowing an even material build-up on the multipole device. Even material build-up may extend the lifetime of the quadrupole without requiring time-consuming or difficult cleaning, as the symmetrical contamination may offset the potential of the contamination region, rather than producing a quadrupolar perturbation.

Optionally, the method may further comprise operating the multipole device to select ions for each mass-to-charge ratio from the list that are assigned to the first polarity configuration and operating the multipole device to select ions for each mass-to-charge ratio from the list that are assigned to the second polarity configuration. Thus, the number of required polarity switches can be minimised by selecting ions of each mass-to-charge ratio in the list assigned to one of the polarity configurations before switching to the other polarity configuration to select the remaining ions.

Optionally, the first time duration may be prior to the second time duration.

Preferably, the sorting may comprise sorting the list into a first sub-list comprising a list of mass-to-charge ratios that are assigned to the first polarity configuration and a second sub-list comprising a list of mass-to-charge ratios that are assigned to the second polarity configuration. Separating the assignments into separate sub-lists may simplify operation of the multipole device, as target m/z within each of the sub-lists can be selected in a straightforward manner. The separate sub-lists may be created within the original list, for example by grouping the set of m/z assigned to one polarity configuration together and grouping the set of m/z assigned to the other polarity configuration together.

Preferably, the operating may comprise selecting ions having the mass-to-charge ratios that are assigned to one of the first and second polarity configurations in order of low to high mass-to-charge ratio and selecting ions having the mass-to-charge ratios that are assigned to the other one of the first and second polarity configurations in order of high to low mass-to-charge ratio. This may enable efficient electrode polarity switching, as it may be significantly faster to switch polarity between two low m/z targets, as the DC transmission may be small. Furthermore, although there may be a hard DC transition when switching between two high m/z targets, there are no large RF quench steps, which may further enable efficient electrode polarity switching.

The operating steps may be repeated (for example, for a different list) such that the operating accordingly occurs in a cycle of high to low, low to high m/z selection. Thus, efficient polarity switching may be enabled throughout the lifetime of the quadrupole device.

Optionally, the operating may comprise selecting the ions in order of low to high mass-to-charge ratio for each of the first and second polarity configurations. Selecting ions in order of low to high m/z may enable efficient data independent acquisition, as the mass transitions may be small and may reduce, limit or minimise the time taken to switch between target m/z.

The method may comprise varying the DC offset applied between the first and second pairs of opposing electrodes. Preferably, the method may further comprise pre-accumulating ions in an ion store whilst varying the DC offset applied between the first and second pairs of opposing electrodes. Adjusting the RF and DC voltages applied to the multipole device (for example, during polarity switching or when switching target m/z) may result in a significant dead time. Pre-accumulating ions in an ion store during this adjustment may lead to less loss of duty cycle, as the analytical instrument is enabled to be operational during this dead time.

Preferably, the varying may comprise varying the DC offset to transition between the first and second polarity configurations, e.g. during a time period between the first and second time durations. Polarity switching may cause the most significant dead time of the analytical instrument. It can therefore be useful to use this time period to accumulate ions for more efficient use of the multipole device.

Preferably, the method may further comprise adjusting a signal measurement detected by a detector based on the operating polarity configuration. The m/z transmission of each polarity configuration may differ for the same m/z value, which can cause problems for quantitation. Adjusting the signal measurement may enable the different transmission rates for the same m/z to be corrected in a simple manner. This may in turn allow results to be compared more directly or used together in a more straightforward and efficient manner.

Preferably, the adjusting may comprise adjusting the signal measurement to at least partially compensate for a difference in an amount of ions transmitted by the multipole device when operating according to the first polarity configuration compared to the second polarity configuration. The adjustment may therefore correct for the difference in transmission in a straightforward manner.

Optionally, the adjusting may comprise adjusting the signal measurement when the difference is greater than a non-zero threshold amount. The difference in transmission for each polarity configuration for some m/z values may not be significant, so this may excessive correction of the signal measurement.

Preferably, the adjusting may comprise adjusting the signal measurement based on one or more adjustment coefficients that are established by:

determining amounts of ions transmitted when operating according to each of the first and second polarity configurations; and calculating, based on the amounts of ions, the one or more adjustment coefficients.

The one or more adjustment coefficients may accordingly be polarity-dependent adjustment coefficients. Calculating the one or more adjustment coefficients based on the amounts of ions may be a straightforward method of establishing the one or more adjustment coefficients and adjusting the signal based thereon.

The one or more adjustment coefficients may comprise one or more m/z dependent adjustment coefficients. The transmission of the polarity configurations may be m/z dependent, with some target m/z being transmitted more or less by a particular polarity configuration than other target m/z. Thus, utilising m/z dependent adjustment coefficients may enable the transmission rates of various m/z to be better accounted for. The m/z dependent coefficients may be calculated by determining the amounts of ions for a plurality of m/z values.

Optionally, determining the amounts of ions transmitted comprises determining a relative transmission factor or (mathematical) difference between the first and second polarity configurations. The relative transmission of, or difference between, the first and second polarity configurations may allow the one or more adjustment coefficients to be calculated in a more straightforward manner.

Preferably, the method may further comprise determining an ion accumulation time for automatic gain control based on the one or more adjustment coefficients. The ion current or measurement scan being used for automatic gain control may have been carried out using a different polarity configuration to the one currently being used. As the transmission rates of the polarity configurations may differ, this may reduce the accuracy of the automatic gain control. Determining an ion accumulation time for automatic gain control based on the one or more adjustment coefficients allows the transmission discrepancy to be taken into account, which may result in more accurate automatic gain control.

Preferably, the determining the amounts of ions transmitted may comprise controlling the multipole device to operate according to one of the first and second polarity configurations to select ions having one or more mass-to-charge ratios from the list that are assigned to the one of the first and second polarity configurations and controlling the multipole device to operate according to the other one of the first and second polarity configurations to select ions having the one or more mass-to-charge ratios from the list that are assigned to the one of the first and second polarity configurations. In other words, although the mass-to-charge ratio may be assigned to only one of the first and second polarity configurations, ions of that mass-to-charge ratio may be selected when operating according to each of the first and second polarity configurations. This may allow transmission comparison measurements to be made extemporaneously and whilst an experiment is running.

Preferably, the calculating may comprise calculating the one or more adjustment coefficients based on a difference in area of the signal measurement when controlling the multipole device to operate according to the first and second polarity configurations for the one or more mass-to-charge ratios from the list that are assigned to the one of the first and second polarity configurations. This may provide a straightforward method of calculating the one or more adjustment coefficients extemporaneously.

Preferably, controlling the multipole device to operate according to the other one of the first and second polarity configurations occurs directly after controlling the multipole device to operate according to the one of the first and second polarity configurations. Some experiments (for example, chromatography-coupled experiments) produce a time-varying ion signal. Controlling the multipole device in this manner may allow an accurate comparison of the relative transmission rates, even for time-varying ion signals. This may enable more accurate and/or up-to-date adjustment coefficients to be calculated. This in turn may also enable more accurate calibration of the multipole device operation for each of the polarity configurations.

Preferably, one or both of the first and second pairs of opposing electrodes are hyperbolic or cylindrical rod electrodes. Hyperbolic electrodes may provide a near-ideal electric field, which is useful for the accuracy of the multipole device (for example, when operating as a mass filter). Cylindrical rod electrodes may be straightforward to manufacture and may sufficiently approximate results achievable by hyperbolic electrodes.

Preferably, the multipole device is a quadrupole device. Preferably, the multipole device is a mass filter. Most preferably, the multipole device is a quadrupole mass filter.

Optionally, the multipole device is arranged upstream of a collision cell. The method may comprise, for each mass to charge ratio from the list, fragmenting the selected ions to produce fragment ions.

Preferably, the collision cell is arranged upstream of a mass analyser. The method may comprise, for each mass to charge ratio from the list, mass analysing the fragment ions to produce an MS2 mass spectrum.

Optionally, a pre-filter is arranged upstream of the multipole device. In this example, the multipole device may also preferably be a quadrupole device, such as a quadrupole mass filter.

Optionally, each of the mass-to-charge ratios in the list is greater than a threshold mass-to-charge ratio value. Additionally or alternatively, each pair of mass-to-charge ratios in the list assigned to the first polarity configuration and/or each pair of mass-to-charge ratios in the list assigned to the second polarity configuration differs by less than a maximum amount.

The sorted list may result in large gaps between any two mass-to-charge ratio values assigned to the same polarity configuration. These gaps may be large enough that they exceed a mass-to-charge ratio window of an upstream device (for example, a pre-filter). This may result in a delay to allow ions to migrate from the upstream device to the multipole device. At low mass-to-charge ratios, the duration of this delay may potentially be longer than the time period required to switch between the first and second polarity configurations. Thus, including a minimum mass-to-charge ratio above which the sorting takes place or requiring that the gap between any two sequential mass-to-charge ratios is less than a maximum amount may reduce the loss of duty cycle of an analytical instrument, which may in turn result in faster analytical instrument operation.

The method may further comprise operating the multipole device according to known methods to select ions having mass-to-charge ratios below the low mass-to-charge ratio threshold. For example, an unsorted list of mass-to-charge ratios may be used and the multipole device may switch between operation according to the first and second polarity configurations assigned to mass-to-charge ratios in the unsorted list. In other words, as the unsorted list is not arranged to comprise blocks of mass-to-charge ratios assigned to the same polarity configuration, the multipole device may switch polarity operation multiple times over the course of an experiment for mass-to-charge ratios below the threshold mass-to-charge ratio value.

Preferably, the threshold mass-to-charge ratio value (which may also be termed a low mass-to-charge ratio threshold) and/or the maximum amount is selected or determined based on a time period to switch operation of the multipole device between the first polarity configuration and the second polarity configuration. Optionally, the low mass-to-charge ratio threshold and/or the maximum amount is selected or determined based on a time interval for allowing ions to travel from an element or device arranged upstream of the multipole device.

For example, the switch in polarity operation modes may take less time than a time duration for ions to travel from an upstream element to the multipole device. An Orbitrap® Astral mass analyser sold by Thermo Fisher Scientific, Inc may take 0.5 and 6 ms (and the same or similar time durations may be the case in general for an analytical instrument including an orbital trapping mass spectrometer or other analytical instruments). However, ion migration from an upstream element to the multipole device may take about 3 ms or more. In cases where the time duration required for ion migration is greater than the time duration required for the polarity switch, it may be preferable to perform a polarity switch rather than maintain a large mass-to-charge ratio gap in the sorted list, since the gap would require implementing a delay to allow for ion migration.

The time duration of the polarity switch may depend on mass-to-charge ratio. For example, the time duration may depend on the settings of the multipole device to select a mass-to-charge ratio selected for analysis at the point of implementing the switch. A higher mass-to-charge ratio value may require a higher DC voltage to be applied to the multipole device, which is then inverted upon polarity switch (thus requiring a large DC transition). Therefore, the maximum amount may also or instead be based on a mass-to-charge ratio value and/or settings of the multipole device. Additionally or alternatively, the threshold mass-to-charge ratio value may be based on the settings of the multipole device.

Accordingly, the method may further comprise:

determining that a pair of mass-to-charge ratios in the list assigned to one polarity configuration differ by more than the maximum amount, wherein one mass-to-charge ratio of the pair is sequentially first in the list;

identifying one or more mass-to-charge ratios assigned to the opposite polarity configuration that differ from the sequentially first mass-to-charge ratio by less than the maximum amount; and switching between operation of the multipole device according to the one polarity configuration and the opposite configuration to select ions having the identified one or more mass-to-charge ratios.

The multipole device may then continue to operate according to the second polarity configuration to select further ions having mass-to-charge ratios from the list that are assigned to the second polarity configuration. In other examples, a further polarity configuration switch may be performed to return to the first polarity configuration. This may occur where the mass-to-charge ratios of the ions selected according to the second polarity configuration differ from a sequentially second one of the pair of mass-to-charge ratios in the list by less than the maximum amount. In other examples, ions having mass-to-charge ratios assigned to the second polarity configuration in the list may already have been selected. That is, the selection of ions having the identified one or more mass-to-charge ratios may be a repeat selection, which may only be performed to avoid the relatively longer ion travel time duration compared to the polarity configuration switch time duration.

The sequentially first one of the pair of mass-to-charge ratios may mean the mass-to-charge ratio of ions that would be selected first if the multipole device were to continue operating according to the first polarity configuration using the list. As the multipole device can be operated from high to low mass-to-charge ratio, low to high mass-to-charge ratio or in another order, the sequentially first one of the pair of mass-to-charge ratios may be either the higher or lower of the two values. In turn, the sequentially second one of the pair may mean the mass-to-charge ratio of ions that would be selected second if the multipole device were to continue operating according to the second polarity configuration using the list.

Optionally, the mass-to-charge ratio threshold is in the range of 400 to 700. For example, the mass-to-charge ratio threshold may be 600. This range and/or this value may be the approximate level at which the time period for ion migration is comparable to or exceeds the time period for switching operation of the multipole device between the first and second polarity configurations for the analytical instruments described herein.

Optionally, the maximum amount is in the range of 10 to 100 thompsons (Th) and may preferably be 10 Th. A thomson is defined as $$1\frac{u}{e} \approx 1.036426\times10^{-8}\ \text{kg/C.},$$

where u represents the unified atomic mass unit and e represents the atomic unit of charge (also known as elementary charge).

Optionally, the maximum amount may be determined by or based on a sliding function that depends on the mass filter window. A mass-to-charge ratio filter window width may be mass dependent and may vary from, for example, 40 to 250 Th. Therefore, a width of a gap that is large enough to exceed the mass-to-charge ratio window of an upstream device may accordingly depend on the mass-to-charge ratio filter window width. For example, the maximum amount may vary between 10 to 100 Th based on a mass filter window that varies between 40 to 250 Th. Applying a maximum amount that depends on the width of the mass-to-charge ratio filter window, possibly in a non-linear manner, may therefore allow more effective use of the analytical instrument, as it may allow greater control of under which circumstances a polarity switch, as opposed to a delay for ion migration, is implemented. This may allow more effective use of the analytical instrument, as loss of duty cycle can be reduced.

In accordance with a third aspect, there is provided a computer program comprising instructions which, when executed by a computer, cause the computer to carry out the methods discussed above.

The above methods may be implemented by a controller configured to operate an analytical instrument comprising a multipole device. The analytical instrument may be or may comprise a mass spectrometer. Similarly, the above methods may be implemented in a system comprising an analytical instrument and a controller configured to operate the analytical instrument. The controller may be included in a system comprising an analytical instrument comprising a multipole device. The methods described above may be implemented as a computer program comprising instructions to operate a computer or computer system. The computer program may be stored on a non-transitory computer-readable medium. The computer or computer system (or other hardware and/or software configured to implement the method) may be embodied as a controller configured to operate an analytical instrument.

It should be noted that any feature described herein may be used with any particular aspect or embodiment of the invention. Moreover, the combination of any specific apparatus, structural or method features is also provided, even if that combination is not explicitly disclosed.

The invention will now be described with reference to the attached drawings depicting different embodiments thereof, the drawings being provided purely by way of example and not limitation.

BRIEF DESCRIPTION OF DRAWINGS

The invention may be put into practice in a number of ways, and preferred embodiments will now be described by way of example only and with reference to the accompanying drawings, in which.

Figure 1:
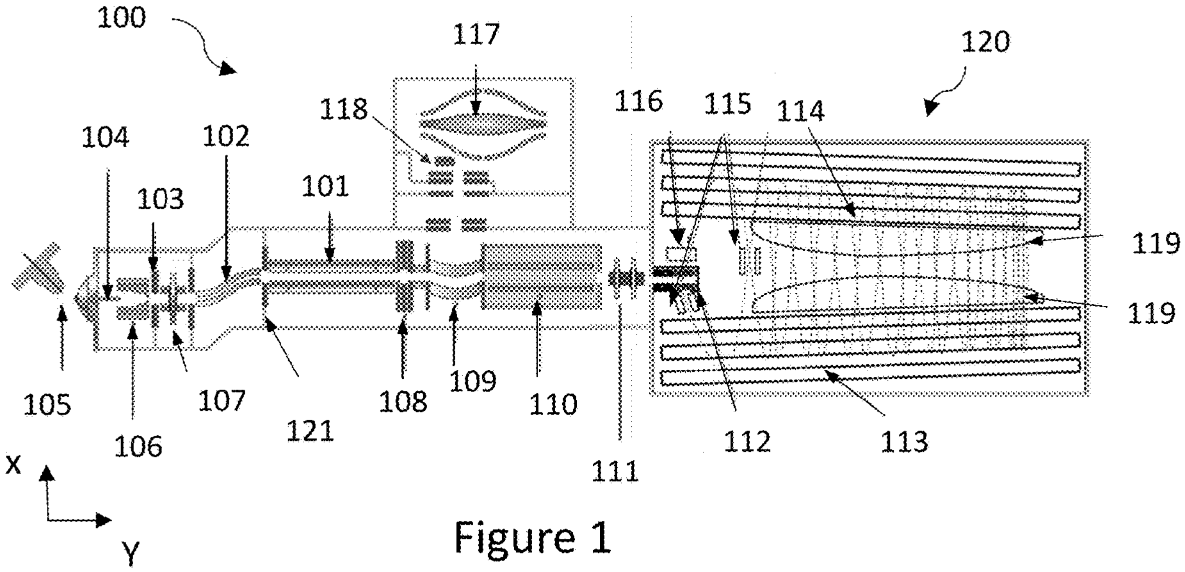
Figure 1 (Prior art)
FIG. 1 illustrates schematically a hybrid mass spectrometer comprising an orbital trapping mass analyser and time-of-flight mass analyser.

It should be noted that the Figures are illustrated in schematic form for simplicity and are not necessarily drawn to scale. Like features are provided with the same (or similar) reference numerals.

DESCRIPTION OF PREFERRED EMBODIMENTS

As discussed above, U.S. Pat. No. 11,062,895 describes switching the polarities of the DC voltages applied to opposing pairs of rod electrodes multiple times over the course of an experiment. However, the inventors in respect of the present disclosure have recognised that the polarity switching discussed in U.S. Pat. No. 11,062,895 can be relatively slow. Switching DC polarity may take up to 5 ms, depending on the m/z separation between the first and second isolation windows (which affect the scale of the DC transition between the DC polarities). More advanced quadrupole power supply designs that can provide faster polarity switching may be possible, but designing and implementing such advanced power supply designs requires time and skilled engineering.

The slow polarity switching may be acceptable when a mass analyser operates relatively slowly, as may be the case for an orbital trapping mass analyser, for example, which may be used in U.S. Pat. No. 11,062,895. These instruments can have several milliseconds of dead time (an amount of time during which the instrument is not active) between injections through the quadrupole. These instruments are thus sufficient for switching polarity for every single scan.

However, other instruments (for example, analytical instruments including time-of-flight, ToF, analysers) may not provide sufficient time to perform polarity switching this many times. For instance, a ToF analyser may target a 200 Hz repetition rate (a 5 ms acquisition cycle), which greatly limits the time available for rod polarity switching. Moreover, for fast analysers (such as, for instance, an MR-ToF analyser), each quadrupole polarity switch comes at the cost of one or more scans. This makes it prohibitively expensive to repeatedly switch polarity.

Furthermore, the highly distributed nature of the encoding discussed in U.S. Pat. No. 11,062,895 may mean that both Data Independent Acquisition (DIA) scans through a fixed series of mass-to-charge (m/z) windows and Data Dependent Acquisition (DDA) scans (where a series of mass targets are generated from full mass scans), can readily trigger a polarity switch with every other scan. Indeed, depending on how the m/z windows are encoded to each polarity configuration, it could be the case that a polarity switch is needed from one precursor to the next during an experiment. This may significantly slow the performance of experiments.

One possibility to avoid the need to switch polarity multiple times would be to encode a first wide mass range to a first polarity configuration (such that target m/z ions within the first mass range are assigned to the first polarity configuration) and a second wide mass range to a second polarity configuration (such that target m/z ions within the second mass range are assigned to the second polarity configuration). However, this encoding might extend beyond the minimum to achieve equal contamination. In other words, the problems associated with unequal contamination noted in U.S. Pat. No. 11,062,895 may occur with such a wide window encoding. Furthermore, wide mass ranges would be less useful in reducing the number of polarity switches for DDA, in which large m/z transitions are often made.

Accordingly, the inventors have recognised that an efficient method capable of reducing or minimising a number of polarity switches is needed. This would enable other instruments to achieve the benefits of reduced rod contamination, even when they do not have a significant dead time.

The present disclosure provides a method of operating a multipole device capable of requiring only one polarity switch during an experiment (although embodiments might use more than one polarity switch). This may be implemented by grouping target m/z values in a precursor list based on a common electrode polarity operation. The target m/z values in the list assigned to one of the polarity configurations are selected by the multipole device during a first time duration in which an attractive DC voltage (for example, a negative voltage for positive ions) is applied to one pair of opposing electrodes and a repulsive DC voltage (for example, a positive voltage for positive ions) is applied to another pair of opposing electrodes. The polarity of the DC voltages is reversed between the electrode pairs, and then precursors in the list grouped to the other polarity configuration are selected during a second time duration distinct from the first time duration. Thus, the target m/z values in the list can be selected efficiently, since only one polarity switch may be used.

The list may be any form of data structure for storing or recording information. The list may be a list, an array or a table, for instance. The list may be provided as a data exchange format file (for example, a spreadsheet format, including options of a .csv or .xml file).

The polarity configuration to be used for each isolation window (which is preferably centred on the target m/z) is advantageously determined according to an encoding. The encoding may be achieved by calculating a hash of a rounded-down centre mass of the isolation window or a hash of another mass value. The target m/z or isolation window may then be assigned to a polarity configuration based on at least one rule (or a set of rules) and the hash value. For example, if the hash value is even, the target m/z or isolation window may be assigned to a first polarity configuration, and if the hash value is odd, the target m/z or isolation window may be assigned to a second polarity configuration.

An experiment may then be performed by operating the multipole device to run through the target m/z values provided in the first list, switching between the first and second polarity configurations, and then running through the target m/z given in the second list. In this way, only one polarity switch may be needed during the whole experiment. Running through the target m/z values (the list) may refer to the process of adjusting mass selection parameters to select ions having each target m/z value in turn.

With reference to FIG. 1, a tandem mass spectrometer 100 that may be used in accordance with the methods disclosed herein is shown. The tandem mass spectrometer 100 may be a hybrid orbital trapping mass analyser/MR-ToF mass analyser.

In FIG. 1, the mass spectrometer 100 comprises an atmospheric pressure ion source 105, which may be an electrospray ionisation source (ESI source). However, it will be understood that other ion sources may be used instead to generate ions. For example, an electron ionisation (EI), chemical ionisation (CI), or matrix-assisted laser desorption/ionisation (MALDI) source may be used. The ion source 105 can be interfaced to a separation device, for example a chromatograph (not shown)

Precursor ions generated by the ESI source 105 then enter a vacuum chamber or vacuum interface of the tandem mass spectrometer 100 and are directed by a capillary 104 into an electrodynamic ion funnel 106. In some embodiments, the ion funnel 106 may be replaced by an RF-only S-lens. The precursor ions are focused by the ion funnel 106 into a quadrupole pre-filter 107 which injects the precursor ions into a bent flatapole 102, which may apply an axial field. The bent flatapole 102 guides (charged) precursor ions along a curved path through it, whilst unwanted neutral molecules, such as entrained solvent molecules (for example) are not guided along the curved path and are lost. The bent flatapole 102 may be of any suitable curved shape. For example, the bent flatapole 102 may be an arc-shape. Calibrant ions may optionally be introduced into the tandem mass spectrometer by an internal calibrant source 103.

An ion gate (TK lens) 121 is located at the distal end of the bent flatapole 102 and controls the passage of the precursor ions from the bent flatapole 102 into a downstream mass selector in the form of a multipole 101, which may preferably be a quadrupole mass filter. Alternatively, the ion funnel 106 may be operated as an ion gate and the ion gate (TK lens) 121 may be a static lens. In embodiments, the ion funnel 106 may be replaced by a RF-only S lens, which may optionally be operated in the same manner. The multipole mass filter 101 is typically but not necessarily segmented and serves as a band pass filter, allowing passage of a selected mass number or limited mass range whilst excluding precursor ions of other mass to charge ratios (m/z). The multipole 101 can also be operated in an RF-only mode in which it is not mass selective (that is, in which it transmits substantially all m/z precursor ions). For example, the multipole 101 may be controlled by a controller (not shown in FIG. 1) to select a range of mass-to-charge ratios of the precursor ions to pass, whilst the other ions in the precursor ion stream are filtered out (not allowed to pass). As such, the mass filter 101 may filter the precursor ions based on the m/z range of interest. The target m/z values may be a series of stepwise increasing or decreasing m/z values across an m/z range of interest (for example, in a DIA method). In another example, the series of target m/z values may be essentially arbitrary or random, for example in a DDA method (that is, depending on which ions appear in an MS1 scan). The multipole 101 will be described in more detail with reference to FIG. 2.

The tandem mass spectrometer 100 may be operated in various modes of operation in order to perform analysis of the precursor ions in the MS1 domain and/or the MS2 domain. In a first mode of operation, the precursor ions may be analysed in the MS1 domain using a first mass analyser (orbital trapping mass analyser 117).

In the first mode of operation, precursor ions may pass through a quadrupole exit lens/split lens arrangement 108 and into a curved linear ion trap (C-trap) 109. The precursor ions may optionally pass into the C-trap 109 via a first transfer multipole (not shown). The C-trap (first ion trap) 109 has curved electrodes extending in a longitudinal direction, which are supplied with RF voltages, and end caps to which DC voltages are supplied. Accordingly, a potential well is formed that extends along the curved longitudinal axis of the C-trap 109. In a first operation mode of the C-trap 109, the DC end cap voltages are set on the C-trap 109 such that ions arriving from the multipole 101 (optionally via the first transfer multipole) are trapped in the potential well of the C-trap 109, where they are cooled. Cooled precursor ions reside in a cloud towards the bottom of the potential well of the C-trap 109. The injection time of the ions into the C-trap 109 determines the number of precursor ions (ion population) that is subsequently ejected from the C-trap 109. From the C-trap 109, precursor ions may be directed to different parts of the tandem mass spectrometer 100, depending on the analysis to be performed.

Where precursor ions are to be analysed by the orbital trapping mass analyser 117 (first mass analyser), the precursor ions are ejected orthogonally from the C-trap 109 via a z-lens 118 towards the orbital trapping mass analyser 117. The ejection may be achieved by switching off the RF voltages applied to the C-trap 109 and applying a DC ejection pulse. As shown in FIG. 1, the orbital trapping mass analyser 117 may be an Orbitrap® mass analyser sold by Thermo Fisher Scientific, Inc. The orbital trapping mass analyser 117 has an off-centre injection aperture and the precursor ions are injected into the orbital trapping mass analyser 117 as coherent packets, through the off-centre injection aperture. Precursor ions are then trapped within the orbital trapping mass analyser 117 by a hyperlogarithmic electric field and undergo back and forth motion in a longitudinal direction whilst orbiting around the inner electrode. The axial component of the movement of the ion packets in the orbital trapping mass analyser 117 is (more or less) defined as simple harmonic motion, with the angular frequency in the axial direction being related to the square root of the mass to charge ratio of a given ion species. The ions thus, over time, separate according to their m/z ratio.

Precursor ions in the orbital trapping mass analyser 117 are detected by use of an image current detector (not shown) which produces a "transient" in the time domain containing information on all of the ion species as they pass the image current detector. The transient is then subjected to a Fast Fourier Transform (FFT), resulting in a series of peaks in the frequency domain. From these peaks, a mass spectrum, representing abundance or ion intensity versus m/z, can be produced.

In the configuration described above, the precursor ions within the mass range of interest (selected by the quadrupole mass filter 101) are analysed by the orbital trapping mass analyser 117 without fragmentation. The resulting mass spectrum is denoted MS1.

Although an orbital trapping mass analyser 117 is shown in FIG. 1, it will be appreciated that other mass analysers may be employed as the first mass analyser according to embodiments of this disclosure. For example, a Fourier Transform Ion Cyclotron Resonance (FTICR) mass analyser may be utilised as first mass analyser to analyse the precursor ions in the MS1 domain. Mass analysers, such as the orbital trapping mass analyser and Ion Cyclotron Resonance mass analyser (for example), may also be used, even where other types of signal processing than Fourier transformation are used to obtain mass spectral information from the transient signal (for example, as discussed in WO 2013/171313). In some embodiments, a ToF mass analyser may also be used in place of the orbital trapping mass analyser 117 to analyse the precursor ions in the MS1 domain.

In a second mode of operation of the tandem mass spectrometer 100, precursor ions may be analysed by the ToF mass analyser 120 (second mass analyser) in the MS1 domain. The precursor ions to be analysed by the second mass analyser may be mass filtered by the multipole 101. As such, the precursor ions may be filtered to include precursor ions from the m/z range of interest, or from a m/z subrange of interest.

In order for the ToF mass analyser 120 to analyse precursor ions, precursor ions may pass from the multipole exit lens/split lens arrangement 108 (and, optionally the first transfer multipole) into the C-trap 109 and continue their path through the C-trap 109 and into the fragmentation chamber 110. As such, the C-trap 109 may effectively be operated as an ion guide in the second mode of operation. Alternatively, cooled ions in the C-trap 109 may be ejected from the C-trap in an axial direction into the fragmentation chamber 110. As the precursor ions are to be analysed in the MS1 domain, the fragmentation chamber 110 is not used to fragment the precursor ions. For example, the ions may not be subjected to a collision gas or the energy of the precursor ions may be insufficient to fragment the precursor ions when they collide with the collision gas. Thus, the precursor ions may continue through the fragmentation chamber 110 and be ejected from the fragmentation chamber 110 at the opposing axial end to the C-trap 109. As such, the fragmentation chamber 110 may also effectively be operated as an ion guide in the second mode of operation.

The ejected precursor ions pass into a (second) transfer multipole 111. The second transfer multipole 111 may guide the precursor ions from the fragmentation chamber 110 into an extraction trap (second ion trap) 112. The extraction trap 112 may be a radio frequency voltage-controlled trap containing a buffer gas. A suitable buffer gas is nitrogen at a pressure in the range $5\times10^{-4}$ mbar to $1\times10^{-2}$ mbar, but other buffer gases may be used. The extraction trap 112 has the ability to quickly switch off the applied RF voltage and apply a DC voltage to extract the trapped precursor ions. A suitable flat plate extraction trap, also referred to as a rectilinear ion trap, is further described in U.S. Pat. No. 9,548,195 (B2). Alternatively, a second C-trap may also be suitable for use as a second ion trap.

The extraction trap 112 is provided to form an ion packet of precursor ions, prior to injection into the ToF mass analyser 120. The extraction trap 112 accumulates fragmented ions prior to injection of the precursor ions into the ToF mass analyser 120.

Although an extraction trap 112 (ion trap) is shown in the embodiment of FIG. 1, the skilled person will appreciate that other methods of forming an ion packet of precursor ions will be equally suitable for the present invention. For example, relatively slow transfer of ions through a multipole can be used to affect bunching of ions, which can subsequently be ejected as a single packet to the ToF mass analyser. Alternatively, orthogonal displacement of precursor ions may be used to form a packet. Further details of these alternatives are found in US-A-20030001088, which describes a travelling wave ion bunching method, the contents of which are herein incorporated by reference.

In FIG. 1, the ToF mass analyser 120 shown is a multiple reflection time of flight mass analyser (MR-ToF). The ToF analyser 120 comprises a pair of ion mirrors (first and second ion mirrors) 113, 114 spaced apart and opposing each other in a first direction X. The ion mirrors 113, 114 are generally elongated along a drift direction Y that is orthogonal to the first direction. The extraction trap 112 injects ions into the first mirror 113 and the ions then oscillate between the two mirrors 113, 114. The angle of ejection of ions from the extraction trap 112 and additional deflectors 115 allow control of the energy of the ions in the drift direction, such that ions are directed down the length of the mirrors 113, 114 as they oscillate, producing a zig-zag trajectory.

The ion mirrors 113, 114 are tilted relative to one another to create a retarding potential that reverses the ion drift, so that the ion path is slowly deflected and redirected back to a detector 116 or lens. The tilting of the opposing mirrors 113, 114 would normally have the negative side-effect of changing the time period of ion oscillations as they travel down the drift dimension. However, this can be corrected for corrected with a stripe electrode 119 (to act as a compensation electrode) that alters the flight potential for a portion of the inter-mirror space, varying down the length of the opposing mirrors 113, 114. The combination of the varying width of the stripe electrode 119 and variation of the distance between the mirrors 113, 114 allows the reflection and spatial focusing of ions onto the detector 116, as well as maintaining a good time focus. A MR-ToF suitable for use in the present invention is further described in US-A-2015/028197, the contents of which are hereby incorporated by reference in its entirety.

Precursor ions accumulated in the extraction trap 112 are injected into the ToF mass analyser 120 (second mass analyser) as a packet of ions. The ions may be injected into the MR-ToF 120 once a predetermined number of ions have been accumulated in the extraction trap 112. By ensuring that each packet of ions injected into the MR-ToF 120 has at least a predetermined (minimum) number of ions, the resulting packet of ions arriving at the detector 116 can be representative of the entire mass range of interest of an MS1 or MS2 spectrum. Accordingly, a single packet of fragmented ions may be sufficient to acquire MS2 spectra of the fragmented ions. This represents an increased sensitivity compared to conventional acquisition of time-of-flight spectra, in which multiple spectra typically are acquired and summed for each given mass range segment. Preferably, a minimum total ion current in each narrow mass window is accumulated in the extraction trap before ejection to the time-of-flight mass analyser 120. Preferably, at least N spectra (scans) are acquired per second in the MS2 domain by the time-of-flight mass analyser 120, wherein N=50, or more preferably 100, or 200, or more. Preferably, at least X % of the MS2 scans contain more than Y ion counts (wherein X=30, or 50, or 70, or most preferably 90, or more, and Y=200, or 500, or 1000, or 2000, or 3000, or 5000, or more). Most preferably, at least 90% of the MS2 scans contain more than 500 ion counts, or more preferably more than 1000 ion counts, or most preferably 5000 ion counts. This provides for an increased dynamic range of MS2 spectra. The desired ion counts for each of the MS2 scans may be provided by adjusting the number ions included in each packet of fragmented ions. For example, in the embodiment of FIG. 1, the accumulation time of the extraction trap 112 may be adjusted to ensure that a sufficient number of ions have been accumulated. As such, the controller may be configured to determine that a suitable packet of fragmented ions has been formed when either a predetermined number of ions are present in the extraction trap, or a predetermined period of time has passed. The predetermined period of time may be specified in order to ensure that the time-of-flight mass analyser 120 operates at the desired frequency when the flow of ions to the extraction trap is relatively low.

In a third mode of operation of the tandem mass spectrometer 100, the TOF mass analyser 120 (second mass analyser) may be used to analyse the precursor ions in the MS2 domain.

In order to analyse the precursor ions in the MS2 domain, some of the precursor ions may be transferred from the multipole 101 to the fragmentation chamber 110 in a manner similar to second mode of operation discussed above.

The fragmentation chamber 110 is, in the tandem mass spectrometer 100 of FIG. 1, a higher energy collisional dissociation (HCD) device. A collision gas may be supplied to the fragmentation chamber 110. When precursor ions are to be fragmented, the kinetic energy of the precursor ions may be increased, so that precursor ions arriving at the fragmentation chamber 110 and colliding with collision gas molecules results in fragmentation of the precursor ions into fragment ions.

Although an HCD fragmentation chamber 110 is shown in FIG. 1, other fragmentation devices may be employed instead, employing such methods as collision induced dissociation (CID), electron capture dissociation (ECD), electron transfer dissociation (ETD), photodissociation, and so forth.

Fragmented ions may be ejected from the fragmentation chamber 110 at the opposing axial end to the C-trap 109. The ejected fragmented ions pass into the second transfer multipole 111 and into the extraction trap 112 where they are accumulated. The fragmented ions may then be injected into the ToF mass analyser 120 as described above.

In another mode of operation, ion fragmentation may occur within a high-pressure region of the extraction trap 112 (instead of in the fragmentation chamber 110).

In another mode of operation, the orbital trapping mass analyser 117 (first mass analyser) may be used to analyse the precursor ions in the MS2 domain. Fragment ions may be passed back from the fragmentation chamber 110 to the C-trap 109 and ejected therefrom into the orbital trapping mass analyser 117 for mass analysis.

It will be appreciated that in some embodiments, the first mass analyser (orbital trapping mass analyser 117) and the second mass analyser (ToF mass analyser 120) may be operated concurrently. That is to say, it will be appreciated that the tandem mass spectrometer 100 may be operated in a first (or other) mode of operation concurrently with the second or third (or other) mode of operation.

The tandem mass spectrometer 100 (or components of the tandem mass spectrometer 100) may be under the control of a controller (not shown) which, for example, is configured to control the timing of ejection of the trapping components, to set the appropriate potentials on the electrodes of the quadrupole, and so on, so as to focus and filter the ions, to capture the mass spectral data from the orbital trapping mass analyser 117, to capture the mass spectral data from the ToF mass analyser 120, control the sequence of MS1 and MS2 scans and so forth. The controller may comprise a computer that functions as a data processor for receiving data from a mass analyser, the data representative of the quantity of mass analysed or detected ions from a mass analyser. The computer may also function as a data processor for processing the data to provide a mass spectrum and/or quantitative analysis of the ions. The controller may further comprise a display and user input device so that a user can view and enter or select information. The user input device may be a keyboard and/or a mouse. It will be appreciated that the controller may comprise a computer that may be operated according to a computer program comprising instructions to cause the analytical instrument or tandem mass spectrometer to execute the steps of the method according to the present invention.

It is to be understood that the specific arrangement of components shown in FIG. 1 is not essential to the methods described herein. Indeed other arrangements for carrying out the methods of embodiments of the present invention are suitable.

Figure 2:
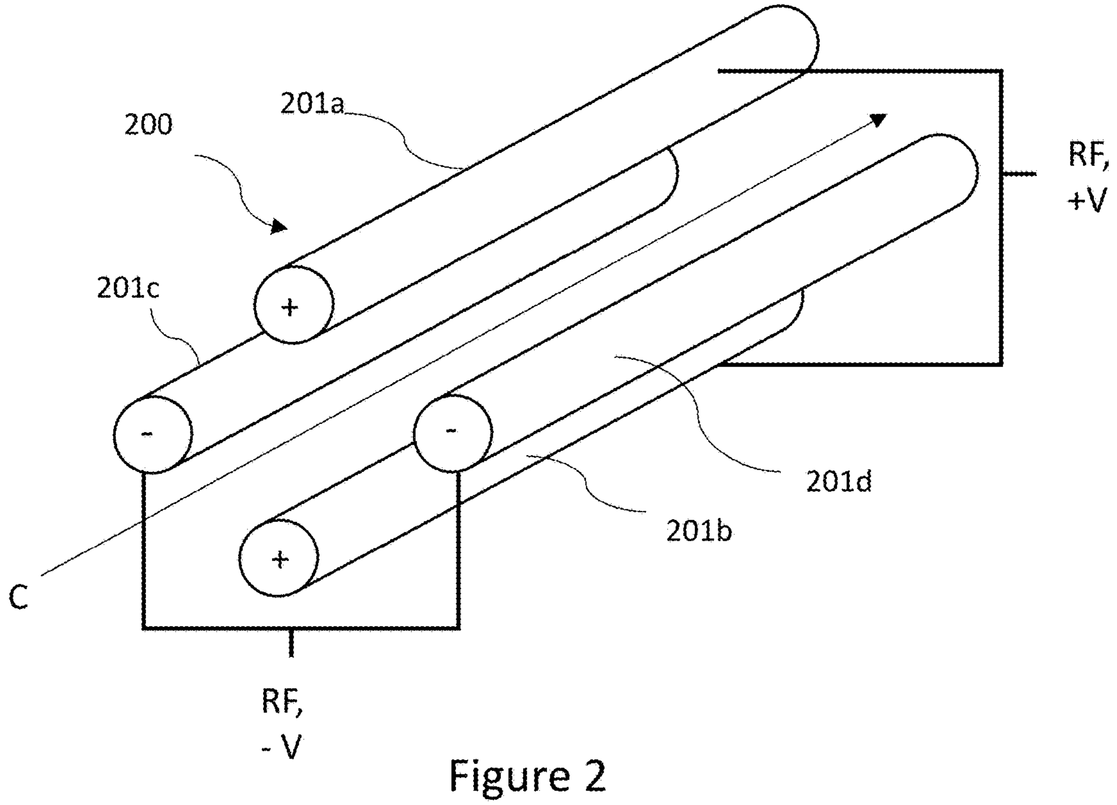
Figure 2 (Prior art)
FIG. 2 shows schematically the electrical and mechanical arrangement of a quadrupole device.

FIG. 2 illustrates an exemplary quadrupole for use in the disclosed method. The quadrupole mass filter 200 comprises four electrodes 201*a-d* arranged in parallel around a central axis C. The electrodes 201*a-d* shown in FIG. 2 are rod electrodes, but in other embodiments, the electrode cross-section may be hyperbolic, square, rectangular or another shape.

A voltage is applied between one pair (or set) of opposing electrodes 201*a, b*, and between the second pair of opposing electrode 201*c, d*. The voltage comprises a radio frequency (RF) voltage, wherein the RF voltage applied to each set of opposing electrodes is equal in magnitude, but 180 degrees out of phase with respect to each other. In other words, an RF voltage is applied to one set of opposing electrodes and an equal magnitude but opposite phase RF voltage is applied to the other set of rods. Ions can thus travel through the quadrupole 200 along the central axis C.

The voltage also comprises a DC offset voltage to cause a first polarity DC offset between the first and second pairs of opposing electrodes. For example, a repulsive voltage (a negative voltage for negative ions, for instance) may be applied to one pair of opposing electrodes 201*a-b*, and an attractive DC voltage (for example, a positive voltage for negative ions) may be applied to the other pair of opposing electrodes 201*c-d*.

For given RF and DC voltage values, ions having a certain m/z (which may be a range of values) will be transmitted through the quadrupole 200, whilst other ions will have unstable trajectories and collide with the electrodes 201*a-d* or otherwise will not be transmitted through the quadrupole. The RF and DC voltage values, as well as other parameters of the quadrupole 200, may be varied to change the selection of ions. These multipole selection parameters may be used to filter ions over a wide range of m/z and with variable mass selection window widths using any method known in the art.

The attractive and repulsive DC voltages may define a cut-off to the range of m/z that can pass through the quadrupole 200. Typically, ions with m/z higher than the selected m/z (defined by the multipole selection parameters) will collide with the attractive electrodes 201*a, b*, while ions with lower m/z will collide with the repulsive electrodes 201*c, d*. As discussed in U.S. Pat. No. 11,062,895, by alternating the pair of opposing electrodes to which the attractive and repulsive DC voltages are applied, material can be deposited approximately equally on each electrode. Even contamination merely offsets the potential of the contamination region, rather than producing a quadrupolar perturbation (which may be problematic for a device that relies on accurate DC and RF voltages to select or transmit ions).

Figure 3A:
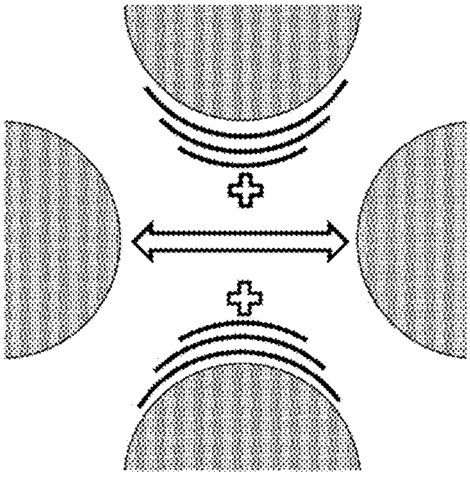
FIG. 3A illustrates a quadrupole mass filter configured to operate according to a single polarity arrangement operation mode and a resulting disturbance in the quadrupolar field.
Figure 3B:
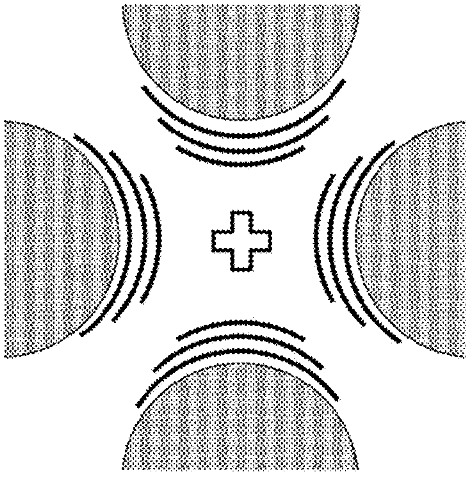
FIG. 3B illustrates a quadrupole mass filter configured to operate according to a switching polarity arrangement operation mode, in which a DC polarity offset between opposing pairs of rods is switched with a pre-determined frequency, resulting in a DC potential offset in the contamination region of the quadrupole mass filter.

A comparison of the conventional method (in which a single rod polarity is maintained throughout the quadrupole lifetime) and the method discussed with reference to FIG. 2 is illustrated in FIGS. 3A and 3B. In FIG. 3A, a single rod polarity arrangement is used, resulting in material build-up on a single pair of rods. Over time, this material build-up becomes charged, which causes a disturbance in the quadrupolar field. The performance of the mass filter will thus suffer—for example, in the form of transmission loss and calibration obsolescence. Mechanical cleaning may be required to regain the loss performance, which is time consuming and can be difficult to perform. In FIG. 3B, the rod polarity is switched regularly, which results in a substantially equal build-up of material on each of the rods. The gradual charging of the contaminated rods thus occurs symmetrically. Whilst the charged contamination offsets the potential of the contamination region, since the charging is (approximately) symmetrical, the quadrupolar field is not disturbed. Thus, the performance of the mass filter can be maintained.

Although the multipole illustrated in FIG. 2 is a quadrupole, it will be appreciated that the methods discussed herein may be implemented with a multipole comprising more than two pairs of opposing electrodes. Three pairs of electrodes, or an even number of pairs, such as four or eight pairs, may be preferable, but any number of pairs may be used. DC voltages may be applied to the electrodes such that neighbouring electrodes receive a DC voltage of opposite polarity, whilst opposing pairs receive a DC voltage having the same polarity.

Similarly, whilst the multipole disclosed above with reference to FIG. 2 has been described as a mass filter, it will be appreciated that other multipole devices may be contaminated in similar manners during operation. The methods disclosed herein may therefore also be used with other multipole devices—for example, ion guides and ion traps.

Figure 4A:
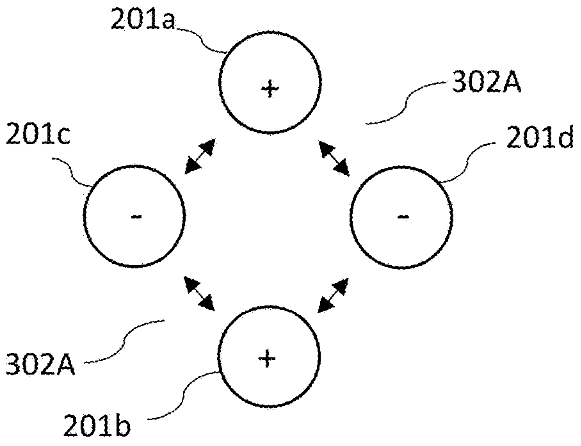
FIGS. 4A-4C illustrate two configurations of applying attractive and repulsive DC voltages to opposing pairs of rods of the quadrupole device, and the usage of the two configurations when applying a hashing algorithm based upon a rounded-down isolation centre mass and, in plots (a)-(e) of FIG. 4C, the change in frequency of configuration switching in the isolation centre mass-domain by applying various factors from 0.25 to 4.0, whilst maintaining balanced usage of each configuration (as shown by the y-axis) label.
Figure 4B:
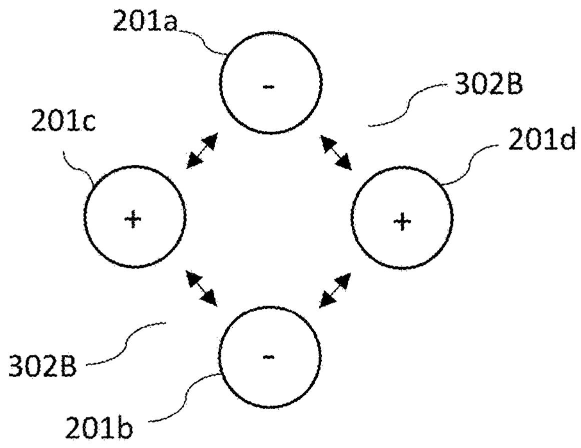
Figure 4C:
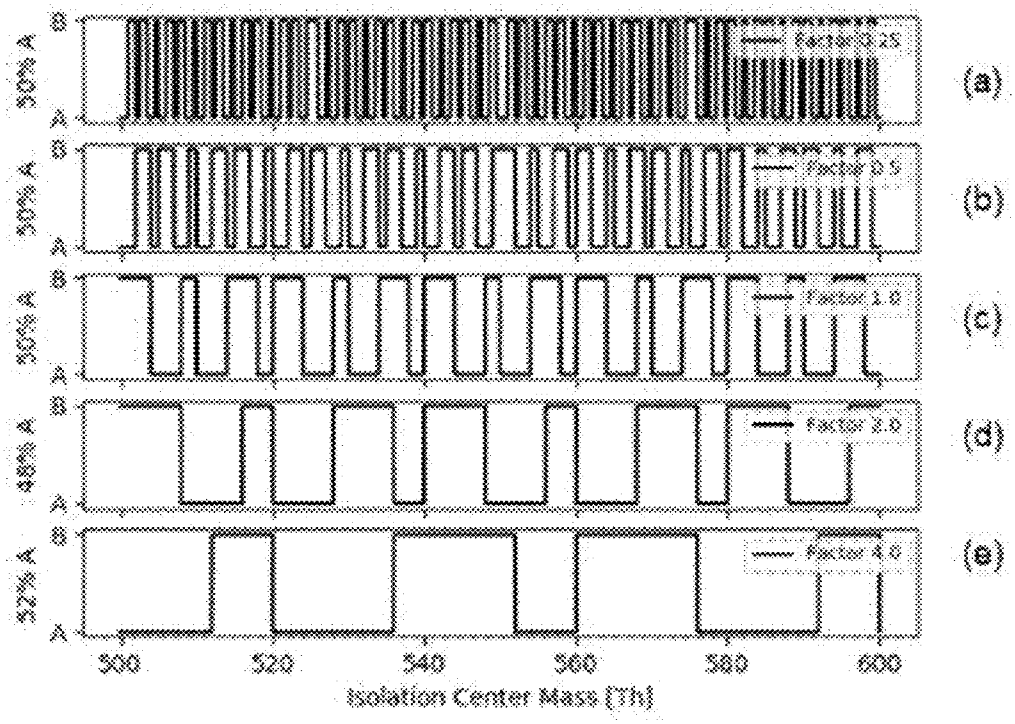
Figure 4C (Prior art)

Referring now to FIGS. 4A-4C, two schematic polarity configurations "A" (FIG. 4A) and "B" (FIG. 4B) are shown. The polarity configurations may also be referred to herein as electrode (polarity) configurations, (electrode) polarity arrangements, DC polarity arrangements, or polarities.

In the polarity configuration A illustrated in FIG. 4A, a positive DC voltage is applied to the first pair of opposing electrodes 201*a-b* and a negative DC voltage is applied to the second pair of opposing electrodes 201*c-d*. The DC voltages thus define a first polarity DC offset 302A between the first pair of opposing electrodes 201*a-b* and the second pair of opposing electrodes 201*c-d*. In the polarity configuration B, a negative DC voltage is applied to the first pair of opposing electrodes 201*a-b* and a positive DC voltage is applied to the second pair of opposing electrodes 201*c-d*. The DC voltages define a second polarity DC offset 302B of opposite polarity to the first polarity DC offset 302A between the first pair of opposing electrodes 201*a-b* and the second pair of opposing electrodes 201*c-d*.

It will be appreciated that the particular polarity of the offsets is arbitrary; it is only necessary that the polarity of the offsets in the polarity configurations A, B are opposite with respect to the same pairs of opposing rods.

The polarity configurations may be defined with respect to a particular pair of electrodes. For example, the pair of electrodes 201*a-b* may define the polarity configuration, such that the polarity configuration A is a "positive" polarity configuration and the polarity configuration B is a "negative" polarity configuration. Similarly, the pair of electrodes 201*c-d* may define the polarity configuration, such that the polarity configuration A is a "negative" polarity configuration and the polarity configuration B is a "positive" polarity configuration. Thus, it will be understood that the labelling of the polarity configurations may be reversed, whilst being operationally identical.

The multipole 101 is configured to switch or transition between the polarity configurations A, B. The switch is caused by reversing the polarity of the DC voltages applied to the opposing sets of rods, which may be effected by the controller. Accordingly, the switch between the polarity configurations A, B, may be referred to as a "polarity switch," "DC transition," or "switching rods" (although the electrodes may not be rod electrodes). The magnitudes of the DC voltages may be varied as well as the polarity.

A switching frequency of the multipole polarity may be adjusted with the use of a factor. For example, a hash code may be calculated from the rounded-down centre mass divided by factors to modulate the switching frequency with centre mass. The effect of these factors on the switching frequency is shown in plots (a), (b), (c), (d) and (c) of FIG. 4C, with factors of 0.25, 0.5, 1.0, 2.0 and 4.0, respectively. Next to the y-axis label is indicated the percentage of selection centre masses assigned to rod pair A. It can be seen that approximately 50% of the centre masses are assigned to rod configuration A (and thus approximately 50% of the centre masses are assigned to rod configuration B). With this method, the rod assignment for a specific mass selection centre mass is independent of the selected range width used. However, it is possible to select the abovementioned factor such that the anticipated selected mass range, usually known before data collection, is sufficiently smaller than the switching intervals in the mass-to-charge domain (the centre mass domain), for example by reference to the mean average of the switching intervals. Plots (a), (b), (c), (d) and (e) of FIG. 4C shows the effect of the aforementioned factors on rod switching intervals for a centre mass range of m/z 500-600: for factors (a) 0.25, (b) 0.5, (c) 1.0, (d) 2.0, and (e) 4.0, the rod switching intervals are 0.5-1.0 thomson (Th), 1.0-2.0 Th, 2.0-4.0 Th, 4.0-8.0 Th, and 8.0-16.0 Th, respectively. A thomson is defined as $$1\frac{u}{e} \approx 1.036426 \times 10^{-8}\ \text{kg/C.},$$

where u represents the unified atomic mass unit and e represents the atomic unit of charge (also known as elementary charge).

As can be seen from FIG. 4C, multiple polarity switches would occur to select a series of ions within the centre mass range of m/z 500-600. In a normal experimental cycle, 200 or more polarity switches may be required by this method. Polarity switching is slow, so minimising or reducing the number of polarity switches required is desirable for the reasons discussed above.

Figure 5:
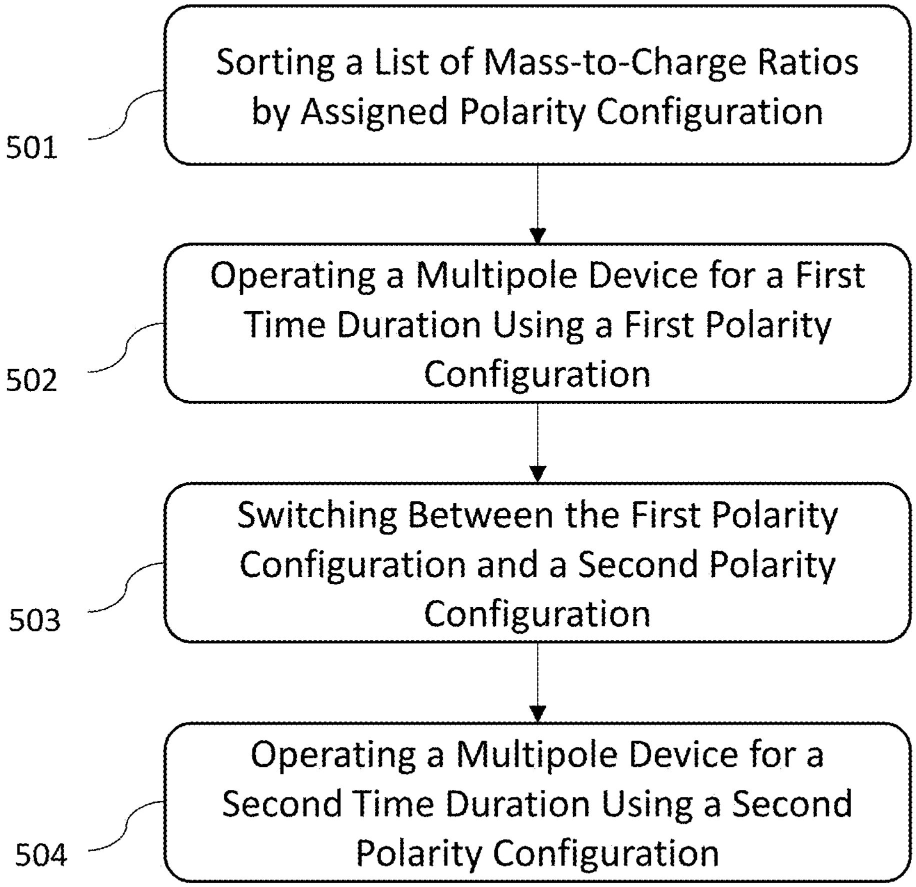
FIG. 5 shows a flowchart of a method of operating a multipole device.

With reference to FIG. 5, there is disclosed a flowchart of a method of operating a multipole device or an analytical instrument comprising a multipole device. The method may be implemented by a controller of an analytical instrument.

In step 501, a list of mass-to-charge ratios that are assigned to one of a first polarity configuration and a second polarity configuration is sorted. The list may be defined or written by a user or otherwise pre-programmed. The list preferably includes at least three m/z values (so that there is at least one m/z value assigned to one polarity configuration and at least two m/z values assigned to the other polarity configuration).

In step 502, the multipole device 101 is operated for a first time duration with the first polarity configuration (which is independent of ion polarity and instrument polarity). During operation of the multipole device 101, ions having mass-to-charge ratios from a list of m/z that are assigned to the first polarity configuration are selected by the multipole device 101. Selection of ions may comprise allowing ions of a selected m/z range to be transmitted downstream, or trapped within the multipole 101. The selected ions may comprise ions each having the same mass-to-charge ratio (to within a threshold tolerance). In other words, one m/z value may be assigned to the first polarity configuration, and ions having the one m/z value may be selected. In another example, the list may comprise two or more m/z values assigned to the first polarity configuration, and ions having each m/z value assigned to the first polarity configuration may be selected in turn.

The assignment of the m/z value(s) to the first polarity configuration may be predetermined. The assignment may be random, pseudo-random or otherwise pre-determined (arbitrarily or otherwise). For example, as described above with respect to FIG. 4C, a hash code may be calculated via any suitable algorithm (such as CRC-32, MD5, SHA-1 or another hash function, for instance) based on the mass-to-charge ratios. In one example, the hash code may be calculated based on a rounded-down centre mass of a selected range of mass-to-charge ratios. In another example, the hash code may be calculated based on a first or last mass of the selected range. For instance, the hash code may be determined from the result of concatenating the rounded-down first mass of the selected range to the rounded-up last mass of the range. The m/z value(s) may be assigned to the first polarity configuration based on the parity of the hash code. In other words, an m/z value may be assigned to one polarity configuration if the calculated hash value is even, and another m/z value may be assigned to the other polarity configuration if the calculated hash value is odd. Other methods of assignment are possible. For example, an m/z value may be assigned to one polarity configuration if the final digit of the hash code is less than or equal to a certain value (for instance, less than 5), and another m/z value may be assigned to the other polarity configuration if the final digit is equal to or greater than a certain value (for instance, more than or equal to 5).

In step 503, the operation of the multipole device 101 is transitioned to the second polarity configuration. The transition comprises adjusting one or more of the DC voltages applied to the opposing pairs of electrodes 201*a-b* and 201*c-d* to reverse the polarity between the opposing pairs of electrodes 201*a-b* and 201*c-d*. Ions may be pre-accumulated in an ion trap (or another device configured to operate as an ion trap) whilst the transitioning between the first and second polarity configurations occurs, as will be discussed in more detail with reference to FIG. 9.

In step 504, the multipole device 101 is operated for a second time duration, after the first time duration, with a second polarity configuration. During operation of the multipole device 101, ions having mass-to-charge ratios from the list that are assigned to the second polarity configuration are selected. The selected ions may comprise ions each having the same mass-to-charge ratio (to within a threshold tolerance). In other words, one m/z value may be assigned to the second polarity configuration, and ions having the one m/z value may be selected. In another example, the list may comprise two or more m/z values assigned to the second polarity configuration, and ions having each m/z value assigned to the second polarity configuration may be selected in turn.

Thus, the steps of operating the multipole device 101 may be ordered such that only one polarity switch may be required to select each of the m/z values. As will be discussed with reference to FIG. 9 though, more than one polarity switch may occur. The ordering is achieved by sorting a list of received mass-to-charge ratios assigned to one of a first polarity configuration and a second polarity configuration. Preferably, the list comprises at least three mass-to-charge ratios (so that at least two mass-to-charge ratios are assigned to one polarity configuration and at least one is assigned the other polarity configuration).

Although FIG. 5 depicts step 503 as occurring after step 501, it will be appreciated that the operation of these steps may be reversed. That is, the second time duration may be before the first time duration and in step 502, the operation of the multipole device 101 may be switched from the second polarity configuration to the first polarity configuration. In this case, the steps of operating the multipole device 101 may still be ordered such that only one polarity switch may be required to select three or more of the m/z values in the list.

Figure 6:
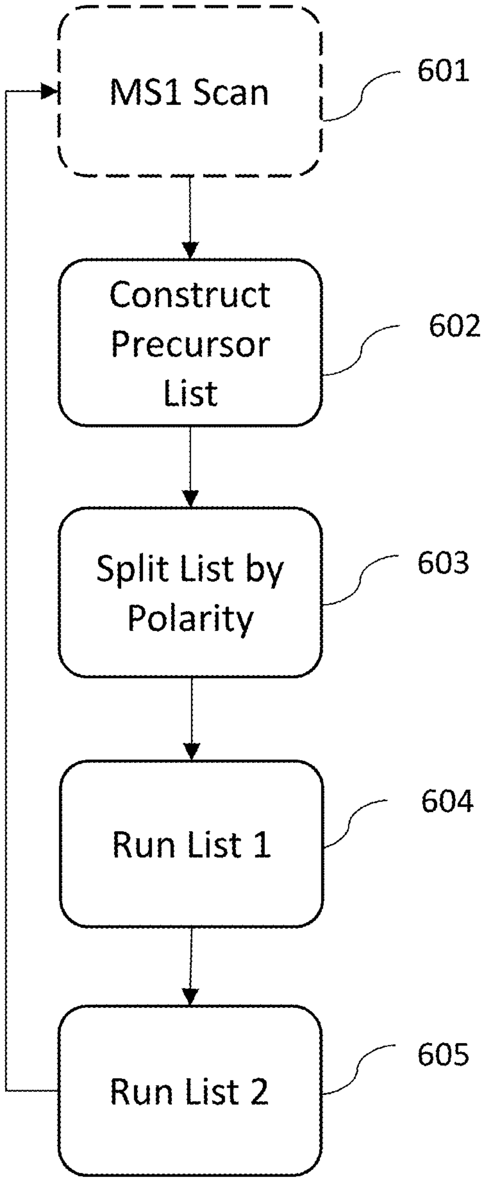
FIG. 6 shows a flowchart method of ordering the step of operating the multipole device for both data-independent and data-dependent acquisition.

FIG. 6 illustrates one flowchart method for ordering the steps of operating the multipole 101. Essentially, the method comprises sorting a precursor list (which contains the target masses (target m/z) for MS/MS spectral acquisition in tandem mass spectrometry experiments) to order the steps of operating the multipole 101. The most efficient sorting comprises splitting the precursor list into two sub-lists: one sub-list comprising a list of target m/z assigned to one of the polarity configurations; and another sub-list comprising a list of target m/z assigned to the other one of the polarity configurations. The splitting may comprise grouping the target m/z assigned to the one of the polarity configurations together and grouping the target m/z assigned to the other one of the polarity configurations together. The grouping may comprise defining or determining isolation windows to select the target m/z in each of the first and second sub-lists. In another example, the isolation windows may be received from a user or pre-determined. The sub-lists may also be referred to as lists.

FIG. 6 shows an implementation within an experimental cycle, which may be DDA or DIA. In conventional DIA, a sequence of mass analyser scans (for example, ToF or orbital trapping scans) is performed with the centre m/z selected by a quadrupole mass filter for each sequential scan increasing stepwise one-way across an m/z range. This is disadvantageous when switching electrode polarity for the reasons discussed above. DDA can be performed in this manner as well, but it is more common to sort scans by order of precursor intensity. The instrument can thus analyse the best (most prominent) peaks in the available time, although this is not very efficient for quadrupole mass filter operation. For example, large DC voltage transitions may be required to move between isolation windows having large gaps between then, which can be slow, particularly when multiple electrode polarity switches are needed.

In contrast, according to the methods described herein, a multipole 101 is operated for a first time duration according to a first polarity configuration to select ions having mass-to-charge ratios from a list of mass-to-charge ratios that are assigned to the first polarity configuration.

An MS1 scan may be run in step 601. This may be performed as described with reference to FIG. 1, although another tandem mass spectrometer, analytical instrument or mass analyser may be used. An MS1 scan is required when operating in DDA mode, but is optional in DIA mode.

In step 602, a precursor list is constructed. In the DIA mode, the precursor list may be written by a user or otherwise pre-programmed. The list may include an array of target masses or mass windows. The mass windows may be of different sizes (widths), include ranges of masses or have different conditions. The different conditions may include, for example, collision energies, RF voltages, resolution settings, ion energies or other parameters.

In DDA, peaks from an MS1 mass scan are recorded. The MS1 mass scan is usually a single wide range scan, though other, more complex methods exist. The list of peaks is then filtered—for example, by intensity, or determining whether a peak with a similar mass has already been recently measured (to eliminate duplicate measurements). The remaining peaks may then be appended to any remaining list of target masses for the experiment, and may be ordered by order of precursor intensity. The window width, collision energy and other configurations are usually defined by a user and may be input using the user input device discussed above.

At step 603, the precursor list is split by electrode polarity. In other words, the precursors are grouped so that their isolation windows are targeted in blocks of like electrode polarity, which may reduce or minimise the required number of electrode polarity switches. The grouping may comprise sorting the precursor list such that all m/z or m/z ranges associated with one of the polarity configurations (for example, the polarity configuration A) are grouped together to create a first sub-list, while all target m/z values associated with the other one of the polarity configurations (for example, the polarity configuration B) are grouped together to create a second sub-list. In another example, splitting the precursor list may comprise separating all the m/z values associated with the one of the polarity configurations into a separate list to create the two lists. In another example, splitting the precursor list may comprise creating two new lists, one of which comprises the m/z values associated with the one of the polarity configurations, the other one of which comprises the m/z values associated with the other one of the polarity configurations.

In step 604, the multipole device 101 is operated to run through one of the sub-lists constructed in step 603 according to the assigned polarity configuration. For example, each of the m/z values in the first sub-list may be targeted using the polarity configuration A. The first sub-list is run through by adjusting the multipole selection parameters to select ions of each isolation window in the sub-list.

Once the final target m/z in the first sub-list has been targeted, the polarity configuration of the electrodes is switched. Then, in step 605, the multipole device 101 is operated to run through the second sub-list using the polarity configuration B. The method then may return to step 601 or 602 (for example, for a new experimental run). In other embodiments (for example, as will be discussed with reference to FIG. 9), only some of the m/z in the first sub-list may be targeted before the multipole device 101 is switched to the polarity configuration B. Stated another way, only part of the first sub-list may be run before the multipole device polarity is switched.

Figure 7:
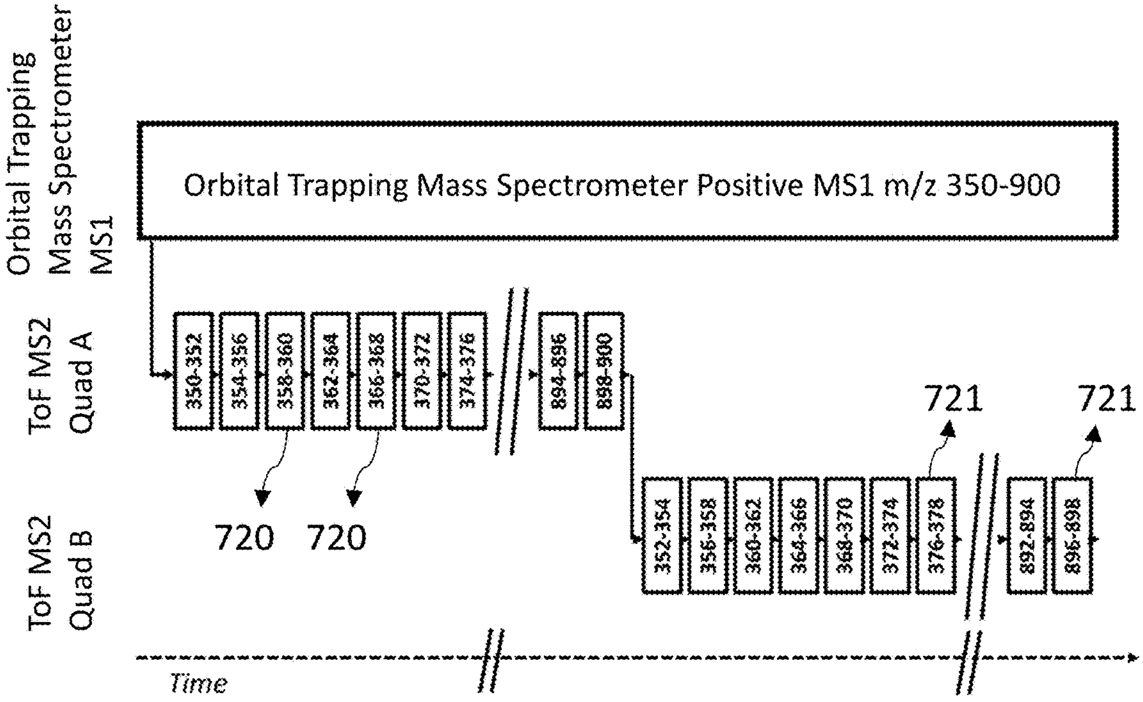
FIG. 7 illustrates an exemplary implementation of a method of operating a multipole device in a hybrid orbital trapping mass analyser/time-of-flight mass analyser mass spectrometer incorporating two interleaved data-independent acquisition cycles, one for each polarity configuration of the rods.

FIG. 7 illustrates an exemplary implementation of the method described in relation to FIG. 6. According to FIG. 7, the method is implemented using a hybrid orbital trapping mass analyser/MR-ToF mass analyser instrument, but it will be appreciated that other tandem mass spectrometers may be used.

The orbital trapping mass analyser makes an MS1 scan at high resolution. Whilst the orbital trapping mass analyser transient is being acquired, ions are sent to the MR-TOF mass analyser to carry out a long series of MS/MS acquisitions within a desired m/z range. The desired range may be between 350 and 900, as shown in FIG. 7, which is typical for digested peptide analysis.

In FIG. 7, a data-independent, pre-set list of precursor ions is used. The m/z windows may be of equal width 720, 721 and the width may be a whole number of thomsons. For example, the m/z window width may be 2 Th. The steps between the m/z windows in each list may also be a whole number of thomsons.

The pre-set list is split into two such that one sub-list is used for a first polarity configuration and a second sub-list is used for the second polarity configuration. In the example illustrated in FIG. 7, the steps are 4 Th, such that, with a 2 Th window width, the two sub-lists are offset by 2 Th. This is a simpler encoding than the randomisation discussed in U.S. Pat. No. 11,062,895, but a random, pseudo-random or another encoding may be used.

The first sub-list is run through (target ions within the first sub-list are selected according to each of the isolation windows 720) using the first polarity configuration. In FIG. 7, the first polarity configuration is shown as polarity configuration A, but polarity configuration B may be used instead. After the first sub-list containing a list of precursors linked to the first quadrupole polarity configuration is complete, the electrode polarity is switched. The precursors of the second list are then delivered to the ToF analyser via the quadrupole device operating according to the second polarity configuration. Although the polarity configuration B is shown in FIG. 7, the second polarity configuration need only be opposite polarity to the first polarity configuration. Thus, polarity configuration A may be used when the first polarity configuration is the polarity configuration B.

The m/z order of each list may be low to high, high to low, or any other order. Certain orderings may provide further advantages. For example, for efficient DIA, running in order of low to high m/z may be most efficient, as the multipole mass transitions are small and RF power supplies tend to step up more quickly than step down. For electrode polarity switching, there is an additional efficiency, in that it is much faster to switch polarity between two low m/z targets, as the DC transition is small.

There may be further benefits to coordinating the order in which ions of m/z values in the first and second lists are targeted. For example, to change the isolated mass (defined by the isolation window) from a high to a low m/z, the RF amplitude applied to the multipole electrodes 201*a-d* should be greatly reduced, which requires a large energy quench. This is a slow step and may be even slower than the DC polarity switch. Therefore, it is advantageous to avoid a large mass transition, such as the mass transition from 900 to 352 shown in FIG. 7, to prevent the large RF quench. This can be achieved by operating the multipole 101 in an alternating cycle of low to high, then high to low m/z (or vice versa). There is a hard DC transition when switching the multipole polarity in this operation, due to the switch between two high m/z targets, but there are no large RF quench steps.

Figure 8:
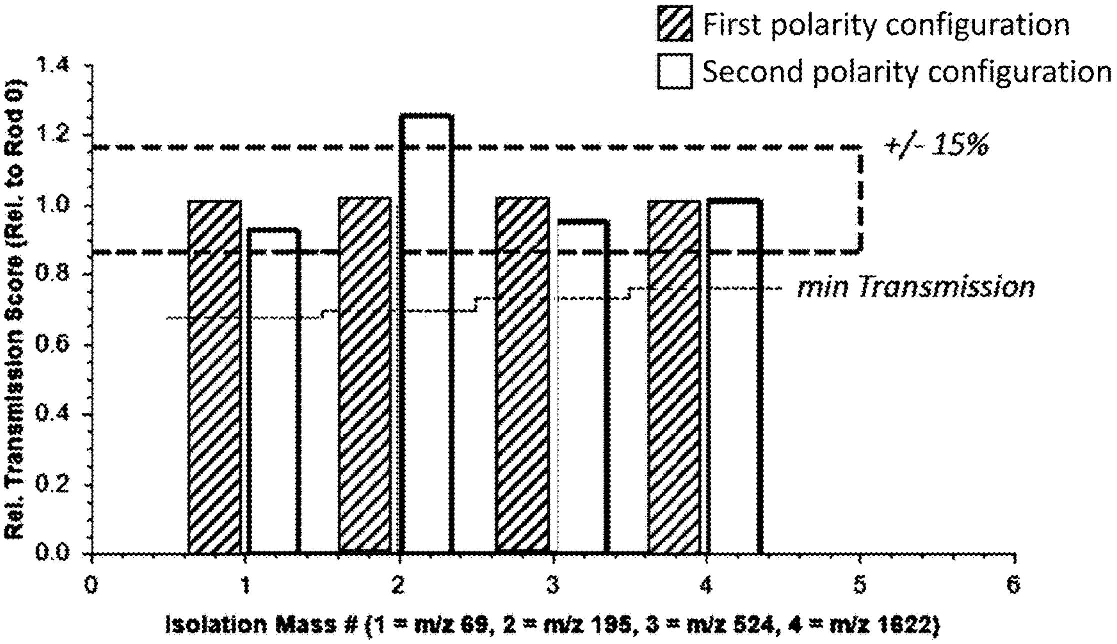
FIG. 8 shows an exemplary measurement of relative rod polarity-dependent and m/z-dependent transmission.

FIG. 8 illustrates an evaluation procedure result comparing transmission at different electrode polarities and m/z values. The main reason for encoding an electrode polarity configuration to a specific m/z, instead of applying one of the two electrode polarity configurations randomly or with every scan or with every experimental run, is that multipole transmission may vary in a polarity-dependent fashion. In other words, the output of one polarity configuration when selecting a particular m/z may not be directly comparable to the output of the other polarity configuration when selecting the particular m/z, as the transmission rate of the particular m/z may differ for each of polarity configurations. This can cause problems for quantitation (determining amounts of particular masses) as, in the case of experimental runs, run-to-run quantitative values can vary by tens of percent. In some embodiments, the manner of creating the hash code may be limited by a requirement that each time the same ionic species (in terms of mass-to-charge ratio) is analysed under conditions that are experimentally comparable, the same configuration of rod pairings of the quadrupole is selected. This may address the potential issue of quantitation.

However, it is also possible to adjust signal measurements by mass and polarity dependent coefficients. The transmission differences between the polarity configurations at various m/z values can therefore be corrected for. A similar correction may be performed in quadrupole/orbital trapping mass spectrometers for mass window width, as narrower windows typically cause greater transmission loss. Mass-dependent transmission losses may be measured as measured in existing instruments. For example, the signal response of each of a number of different isolated m/z ions may be measured and the isolation window width reduced. The ion signal intensity may decrease as the isolation window narrows, since narrow windows typically cause greater transmission loss.

Accordingly, there is provided a method of operating a multipole device 101, the method comprising operating the multipole device 101 for a first time duration according to a first polarity configuration, in which a first polarity DC offset is applied between the first and second pairs of opposing electrodes 201*a-d*, to select ions having a mass-to-charge ratio. The method further comprises operating the multipole device 101 for a second time duration, distinct from the first time duration, according to a second polarity configuration, in which an opposing polarity DC offset is applied between the first and second pairs of opposing electrodes, to select ions having a different mass-to-charge ratio.

The method additionally comprises adjusting a signal measurement detected by a detector based on the operating polarity configuration. The adjusting may comprise adjusting the signal measurement to at least partially compensate for a difference in an amount of ions transmitted by the multipole device 101 when operating according to the first polarity configuration compared to the second polarity configuration. The adjusting may comprise calculating one or more coefficients or scaling factors that at least partially compensate for the difference and adjusting the signal based on the one or more coefficients. The adjustment to the signal may be an adjustment of an ion current estimation, a voltage or signal area, a number of ions in peak, a current or another signal measurement. The one or more adjustment coefficients may comprise one or more m/z-dependent adjustment coefficients.

This method may be implemented in combination with the polarity switching methods discussed herein. For example, the step of operating the multipole device 101 for the first time duration may comprise operating the multipole device 101 to select ions having a mass-to-charge ratio range from a list that is assigned to the first polarity configuration. In this example, the different mass-to-charge ratio range may be a mass-to-charge ratio from the list that is assigned to the second polarity configuration. However, it will be appreciated that the method need not be implemented in combination with the minimised or reduced polarity switching methods discussed above. In particular, differences in transmission may be corrected for when multiple (for example, non-minimised) polarity switches occur. For instance, instead of ordering the steps of operating the multipole device 101 or sorting the precursor list by assigned multipole polarity configuration, a polarity switch may occur after a pre-determined time period, or according to the encoding described in U.S. Pat. No. 11,062,895, or according to another method. Multiple polarity switches may thus occur during an experiment.

As shown in FIG. 8, relative transmission amounts between polarity configurations may differ significantly in an m/z dependent manner. For example, in the example shown in FIG. 8, m/z 195 is outside instrument tolerances (indicated by the dashed line box), with one pair of electrodes transmitting 20% more ions than the other for the second polarity configuration compared to the first polarity configuration. Although the dashed line box represents a 15% threshold variation tolerance between the first and second polarity configurations, another threshold variation tolerance may be used. For example, a 1%, 5%, 10% or another tolerance value may be implemented. A minimum transmission trend is also shown in FIG. 8, illustrating the absolute transmission of the rod polarity configuration decreasing, relative to specification values, as m/z increases.

The relative transmission amounts or transmission scores may be used to determine a correction coefficient (which may also be referred to as an adjustment coefficient, correction factor, transmission coefficient or simply a "coefficient"). The correction coefficient may be m/z dependent. For example, the correction coefficient may be determined by fitting a function to the transmission scores and using the fitted function to adjust signal intensity of any peak. The fitted function may be determined by any known method of curve fitting. For example, the curve fitting may include interpolation, which may include polynomial interpolation, spline interpolation or another type of interpolation, for instance. The fitted function may include complex variables. In another example, the correction coefficient may be m/z independent. For example, relative transmission amounts of one m/z value may be used to calculate a correction coefficient to be applied for another (or any) m/z value.

Adjusting the signal intensity of one or more peaks based on the correction coefficient may be very compatible with fast experiments, as it may eliminate the need to change polarity within any single experimental run. Furthermore, the determined transmission coefficient can be used in the prediction of ion accumulation times required for any orbital trapping mass spectrometer or ToF scan, if the current measurement scan for automatic gain control (AGC) is carried out in the other polarity. AGC uses reference data from a previous scan (which may be a pre-scan) to predict a future ion current (indicative of a number of ions) in the mass analyser. The predicted ion current can be used to determine and set an injection time (typically a time duration for which a gate remains open so that ions can accumulate in a mass analyser). AGC is useful for preventing or reducing issues associated with accumulating too many ions in a fill space (for example, space charge effects or exceeding an analyser repetition rate).

The determined transmission coefficient can be used in the prediction of the future ion current, which may be in addition to other correction factors that may be used, such as (for example) isolation window width, source RF amplitude, and/or other correction factors. The predicted ion accumulation time may be proportional to the relative transmission amount.

It is expected that the relative transmission, and thus optimal correction coefficients, may change over time as the multipole device 101 becomes contaminated. Full recalibration may be performed regularly, but this may be a time-consuming process, particularly if a calibration solution has to be injected into the mass spectrometer. Another option is therefore to make transmission comparison measurements whilst experiments are running.

One way to implement this is to perform a repeat selection or repeat targeting of ions, one selection for each quadrupole polarity, and measure the difference in signal area. The difference may be measured using any method known in the art. Transmission coefficients can then be recalculated based on this additional data.

Performing repeat selections need not result in more than one polarity switch. For example, the m/z value to be targeted more than once may be inserted into the second sub-list while the first list is being run or may be included in both lists before any selection of ions has begun. The repeat selection may then be performed during the running of the second list. Accordingly, a minimum (non-zero) number of polarity switches may be maintained, even with repeat selections to re-determine correction coefficients.

Figure 9:
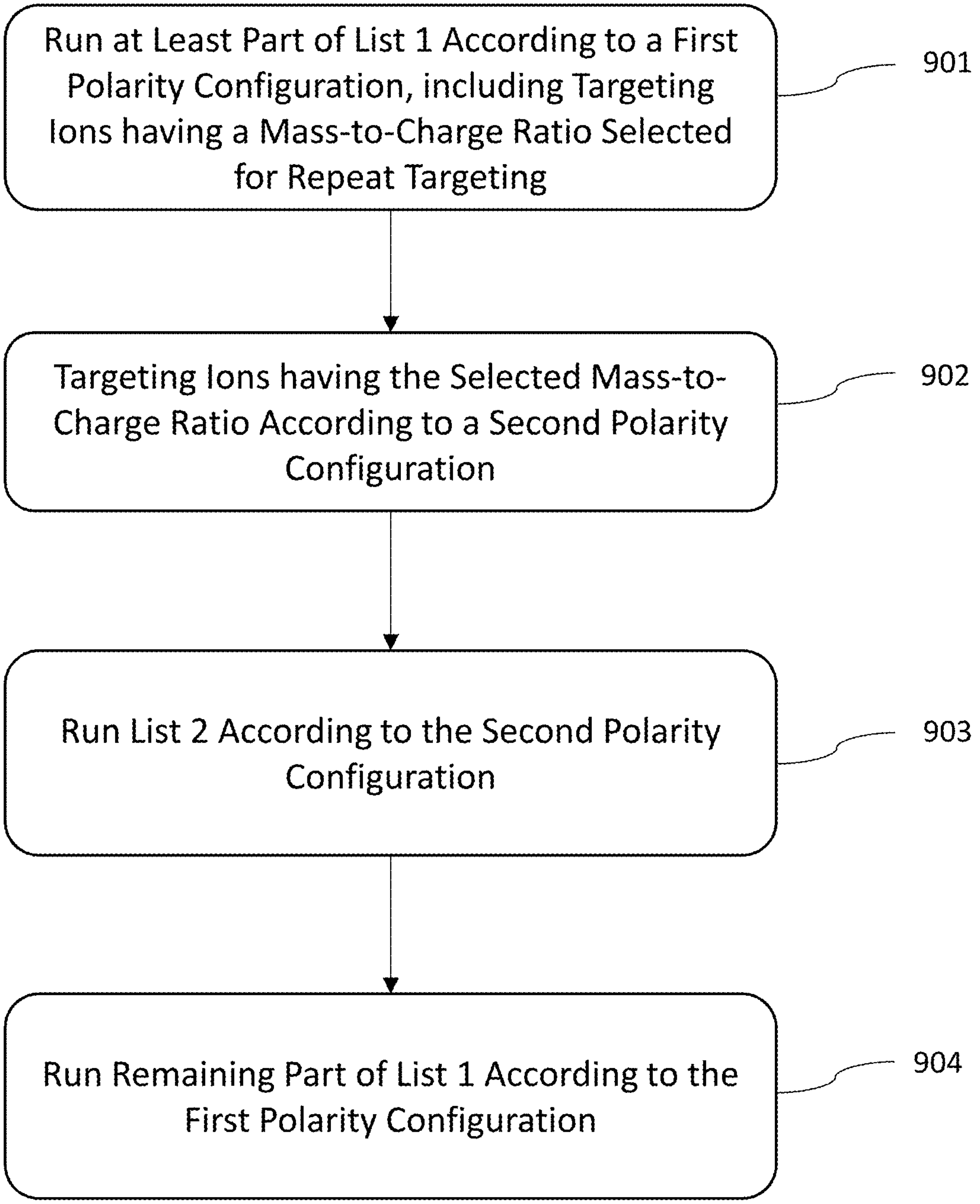
FIG. 9 shows a flowchart method of performing repeat selections of ions within a selected mass-to-charge ratio range according to each of a first and second polarity configuration.

Since chromatography coupled experiments (for example, LC-MS or GC-MS) produce a time-varying ion signal, it is optimal to perform both measurements in (direct) succession. Accordingly, FIG. 9 illustrates a method of operating the multipole device 101 that enables performing repeat targeting in succession when grouping target m/z by common polarity configuration. As used herein, successive measurements may mean that operations are performed consecutively, in uninterrupted order or without interval (or at least with an interval time duration less than a threshold amount), or directly after each other.

In step 901, at least part of the first list is run according to the first polarity configuration (which may be either the polarity configuration A or B), including targeting ions having an m/z selected to be used for repeat targeting. When operating the mass spectrometer according to the first polarity configuration for the full list, a target m/z at one end of the m/z range of interest (for example, m/z 350-900) in the first list may be selected for repeat targeting. The selected target m/z may be the highest or lowest m/z in the first list—for example, when the multipole device 101 is configured to run from low to high m/z or high to low m/z. Referring to the example in FIG. 7, the selected target m/z may be defined by the final isolation window 721 of m/z 898-900. In other examples where one or both of the sub-lists are not ordered by m/z (for example, are ordered in another manner or are randomly or arbitrarily ordered), the repeat m/z may be another target m/z. Selecting the m/z at one end of the m/z range may allow repeat targeting to be implemented in a straightforward manner without requiring more than one polarity switch.

In other embodiments, correction coefficients may be required more regularly, or repeat selections of a specific m/z may be desired, such that the final isolation window defining the target m/z in a list cannot be used conveniently for a repeat selection. In this case, the delay of switching polarity may be accepted to provide a more up-to-date or accurate correction factor earlier in an experimental run. Furthermore, it may be possible to reduce or minimise the number of polarity switches required by running the remainder of the second sub-list after the polarity switch.

For example, a target m/z range within the m/z range may be selected (randomly, arbitrarily, pre-programmed or user-selected) for use as a repeat selection. Referring again to FIG. 7, the m/z may be associated with the isolation window 720 374-376, for instance. It will be appreciated that any other target m/z within the first list may be used though. Thus, still referring to step 901, the first list may be run as normal up to and including the selected m/z.

In step 902, the polarity of the multipole device 101 may be switched and ions having the selected (target) m/z selected using the second polarity configuration. This selected m/z may be inserted into or appended to the second list as a first target m/z to perform both measurements successively in a straightforward manner. Alternatively, the selected m/z value may be targeted in the second polarity configuration directly after the targeting in the first polarity configuration, but not be included as part of the second list (for example, it may instead be a separate list or value). The correction factor can be determined based on the two successive selections.

The multipole device 101 may then run through the precursors of the second list in step 903. For example, the multipole 101 may continue to run through the second precursor sub-list as programmed (which may be from low to high m/z, as shown in FIG. 7, high to low m/z, randomly, pseudo-randomly or using another ordering). In the case where the selected target m/z is an initial or final m/z of the first list, the second list can therefore run in full. Thus, a minimum (or reduced) number of polarity switches can be achieved, even when performing repeat targeting of m/z values back-to-back.

The multipole device 101 may run through the second list in any other order. However, the multipole device 101 may preferably run through the list in one of the manners discussed above to optimise the DC voltage transitions and/or RF quenches.

For instance, the isolation window 720 discussed above (m/z=374-376) is relatively similar to an isolation window 721 for selection ions having an m/zin the second list (m/z=352-354). The DC transition between the selected m/z and the low m/z of the second list would therefore be relatively small and the RF quench to select the low m/z would also be minimised. In step 903, the second list may therefore be run from low to high m/z after the repeat selection of step 902.

In another example, the selected m/z may be towards the middle of the m/z range, such that running the second list from low to high m/z may require a large RF quench. In this case, the multipole device 101 may run the list from the selected m/z to one end of the second list (that is, from the selected m/z to high m/z, or from the selected m/z to low m/z). The DC transition may therefore still be relatively small. Running from the selected m/z may mean selecting ions having an m/z in the second list closest to the selected m/z (or an isolation window similar to the isolation window for the selected m/z), as the second list may not include the selected m/z itself.

The remainder of the second list can then be targeted. The isolation windows for the target m/z in the second list may again be run through in an order to optimise the DC voltage transitions and/or RF quenches. For example, after running from the selected m/z to high m/z, the remainder of the second list may be run from the selected m/z to low m/z. This may minimise the large RF quench, as adjusting the multipole selection parameters to target ions within the selected m/z may not require as large an RF quench as adjusting the multipole selection parameters to target ions in the lowest m/z in the second list. In another example, after running from the selected m/z to low m/z, the remainder of the second list may be run through from the selected m/z to high m/z. Whilst this may require a large DC transition to adjust the multipole selection parameters to shift the selected m/z from low m/z to the selected m/z, this ordering may avoid the need for a large RF quench step, which may be slower than the DC transition.

In yet a further example, after targeting the selected m/z, the second list may be run from high to low m/z. Although this may require a large DC transition when changing the multipole selection parameters, this may avoid large RF quenches, which can be slow.

In an additional example, selection of the precursors in the second list may be from low to high m/z. Although running the second list from the lowest m/z to the highest m/z after running the repeat selection may require an RF quench, there may be advantages to doing so. For example, this may be useful for avoiding an RF quench and/or large DC transition when running the remainder of the first list, after performing a second polarity switch.

The first list may have been fully run through in step 901 (for instance, when the selected m/z is a final m/z of the first list). In this case, the method may end after step 903. Otherwise, the polarity configuration is switched to the first polarity configuration and, in step 904, the remainder of the first list is run. As discussed above in relation to step 903, the remaining part of the first list may preferably be run in an order to minimise large RF quenches and/or DC transitions.

Preferably, several m/z values are selected to better account for the m/z dependency of transmission, although applying a mass-independent adjustment (that is, based on only a single repeat measurement) to the transmission calibration may be performed at sufficient accuracy. The transmission measurements may be incorporated in a moving averaged manner to minimise the influence of noise. For instance, the transmission coefficient may be an average of previously calculated transmission coefficients.

The methods described above in relation to FIGS. 8 and 9 have been described with reference to reducing or minimising polarity transitions. However, it will be appreciated that this need not be the case. In particular, these methods may be implemented in combination with multiple (non-minimised) polarity switches. For example, different polarity configurations may be used for a selected m/z value (in other words, ions having the m/z value may be selected twice, once for each polarity configuration), but m/z windows may not be grouped together by polarity configuration. The steps of operating the multipole device 101 may accordingly not be ordered to reduce or minimise polarity switching.

For example, it may be determined that a pair of mass-to-charge ratios assigned to the first polarity configuration and/or second polarity configuration differ by more than a maximum amount. In this case, a polarity switch may be performed to avoid a delay for allowing ions to migrate from an upstream device (such as a pre-filter) to a downstream device by selecting ions having one or more mass-to-charge ratios assigned to the other polarity configuration (for example, where the difference between the sequentially first of the pair and the one or more mass-to-charge ratios is less than the maximum amount). In this case, the multipole device may continue to operate according to the other polarity configuration as described above with reference to step 903. Similarly, the multipole device may switch polarity configuration to operate as described above with reference to step 904.

Although the methods and systems described above can enable a reduced number of polarity switches during operation of the multipole device 101, each polarity switch may still result in a significant dead time (for example, 5 ms or more). An ion beam received from the multipole device 101 is normally dumped at the charge detector or ion gate 108 during this period and is lost. Faster analytical instrument or mass spectrometer operation (that is, having reduced operation cycle time) accordingly leads to loss of duty cycle (the period during which the mass spectrometer is active), as the time required for the polarity switch generally cannot be reduced. For example, for an orbital trapping mass analyser acquisition cycle resolution setting of 7500 (16 ms transient), the overall cycle time may be 20 ms or more. A 5 ms dead time is therefore a significant portion of the operation cycle in this example. In another example, a triple quadrupole mass spectrometer may be operated at a repetition rate of about 1 kHz, at which rate quadrupole polarity switching would take up 50% of the 1 ms available accumulation time.

However, the inventors have recognised that this dead time can be used to accumulate ions in an ion store whilst the multipole device is switching electrode polarity (or during another electrode voltage transition, such as when adjusting the multipole selection parameters to select a next target ion).

Accordingly, there is a method of operating an analytical instrument comprising a multipole device 101 and an ion store. The method comprises operating the multipole device 101 for a first time duration according to a first polarity configuration, in which a first polarity DC offset is applied between the first and second pairs of opposing electrodes 201*a-d* of the multipole device, to select ions having a mass-to-charge ratio. The method further comprises operating the multipole device 101 for a second time duration, distinct from the first time duration, according to a second polarity configuration, in which an opposing polarity DC offset is applied between the first and second pairs of opposing electrodes 201*a-d*, to select ions having a further mass-to-charge ratio. The method additionally comprises (pre-) accumulating ions in the ion store whilst transitioning between the first and second polarity configurations.

This method may be implemented in combination with the polarity switching methods discussed herein. For example, a list of mass-to-charge ratios may be sorted by assigned polarity configuration and the mass-to-charge ratios selected when operating the multipole device 101 for the first time duration may be or comprise mass-to-charge ratios from the list that are assigned to the first polarity configuration. In this example, the further mass-to-charge ratio may be or comprise mass-to-charge ratios from the list that are assigned to the second polarity configuration. However, it will be appreciated that the method need not be implemented in combination with the reduced polarity switching methods discussed above. In other words, the method may be implemented in combination with multiple (non-minimised) polarity switches. Thus, ions can be pre-accumulated more regularly.

Figure 10:
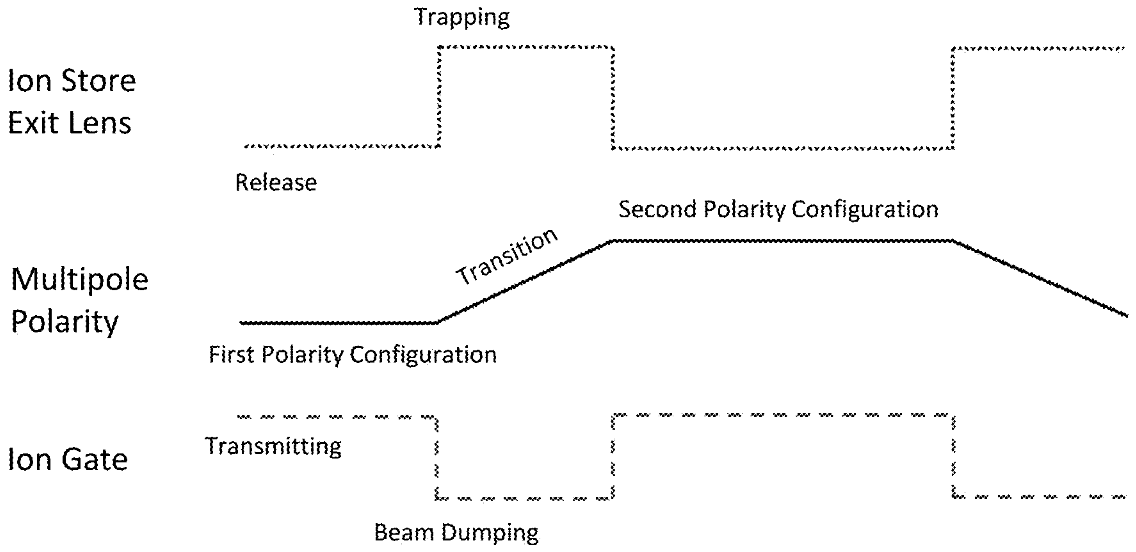
FIG. 10 illustrates an example timing diagram for pre-accumulation of ions within an ion store during a polarity transition.

With reference to the method of operating the analytical instrument, FIG. 10 illustrates a timing diagram for multipole polarity, ion store exit lens that generates a trapping potential, and an ion gate 108 that allows ions to pass from the multipole 101 to the C-trap (ion trap) 109. While the multipole polarity remains unchanged, a DC voltage is applied to the ion store exit lens to allow ions to be transmitted downstream. Similarly, another DC voltage is applied to the ion gate 108 to allow ions to pass from the multipole 101 to the C-trap 109.

During the polarity configuration transition, the DC voltage applied to the ion store exit lens is adjusted to store or trap ions within the ion store. Also during the polarity configuration transition, the another DC voltage applied to the ion gate 108 is adjusted to prevent ions from passing into the C-trap 109.

After the polarity of the multipole 101 has switched, the ion store exit lens DC voltage and ion gate DC voltage are adjusted back to transmitting potentials. The DC voltages adjustment may occur once the multipole polarity switch has completed. In other words, the ion store exit lens DC voltage and ion gate DC voltage may be adjusted directly in response to completion of the multipole polarity switch. The adjustment may be effected by the controller discussed above with reference to FIG. 1. In another example, pre-accumulation time may depend on the time available for ion accumulation—for example, as described in UK patent application no. 2216594.8 (which is hereby incorporated by reference).

The method described above may be used when more than one polarity switch occurs during an experimental run. The more than one polarity switch may be as a result of the subsequent repeat targeting discussed herein, or may be multiple polarity switches as described in U.S. Pat. No. 11,062,895.

The ion store may be provided by any device capable of storing ions, but the ion store may most preferably be a bent flatapole 102. The bent flatapole 102 has quadrupole structure that is curved or bent to separate ions from neutrals. The bent flatapole 102 incorporates a superimposed DC gradient, generated by a series of PCB printed DC electrodes. An exit lens aperture with an independent voltage separates the device from the multipole 101. Structurally, this allows the bent flatapole 102 to be used as an ion trap, where trapping or release of ions may be controlled by switching the DC voltage applied to the exit lens. The ions can thus be trapped by bent flatapole 102 during the period in which the multipole polarity switch occurs. A trapping potential may be in the range of 10-20 V (positive or negative, depending on the ion charge polarity) during the dead time. A transmitting potential has a DC polarity opposite that of the trapping potential, and may be in the range of 45-35 V.

The methods described herein may be implemented with computer system configurations including hand-held devices, microprocessor systems, microprocessor-based or programmable consumer electronics, minicomputers, mainframe computers and the like. The embodiments can also be practiced in distributed computing environments, where tasks are performed by remote processing devices that are linked through a network.

The computer system may include a processor, such as a central processing unit (CPU). The processor may execute logic in the form of a software program. The computer system may include a memory including volatile and non-volatile storage medium. The different parts of the system may be connected using a network (e.g. wireless networks and wired networks). The computer system may include one or more interfaces. The computer system may contain a suitable operating system such as UNIX (including Linux) or Windows®, for example.

Certain embodiments can also be embodied as computer-readable code on a non-transitory computer-readable medium. The computer readable medium may be any data storage device than can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Although embodiments according to the disclosure have been described with reference to particular types of devices and applications (particularly mass spectrometers) and the embodiments have particular advantages in such case, as discussed herein, approaches according to the disclosure may be applied to other types of device and/or application. The specific calibration details of the multipole, whilst potentially advantageous (especially in view of known calibration constraints and capabilities), may be varied significantly to arrive at devices with similar or identical operation. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the aspects and/or features disclosed in this specification may be combined in any combination, except combinations where at least some of such features and/or steps are mutually exclusive. In particular, the preferred features of the disclosure are applicable to all aspects and embodiments of the disclosure and may be used in any combination. Likewise, features described in non-essential combinations may be used separately (not in combination).

The methods and apparatus of the present disclosure can be utilised with a variety of electrode structures. Electrodes of appropriate dimensions can be arranged into symmetrical or asymmetrical patterns upon substrates and if elongation of electrodes is beneficial for a particular application, the electrodes may be linear or curving. Individual electrodes can be planar, hemispherical, rectangular or of other shapes. The electrodes may be PCB printed electrodes.

It will be appreciated that there is an implied "about" prior to temperatures, concentrations, times, pressures, flow rates, cross-sectional areas, voltages, currents, etc. discussed in the present teachings, such that slight and insubstantial deviations are within the scope of the present teachings. Furthermore, values referred to as being "equal" may in fact differ by less than a threshold amount. The threshold amount may be 5%, for example. The threshold may also be greater than 5% (e.g., 10%, 20% or 50%) or less than 5% (for example, 2% or 1%), depending on the context.

As used herein, including in the claims, unless the context indicates otherwise, singular forms of the terms herein are to be construed as including the plural form and vice versa. For instance, unless the context indicates otherwise, a singular reference herein including in the claims, such as "a" or "an" (such as an electrode) means "one or more" (for instance, one or more electrodes).

Throughout the description and claims of this disclosure, the words "comprise", "including", "having" and "contain" and variations of the words, for example "comprising" and "comprises" or similar, mean "including but not limited to", and are not intended to (and do not) exclude other components. Also, the use of "or" is inclusive, such that the phrase "A or B" is true when "A" is true, "B is true", or both "A" and "B" are true.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

The terms "first" and "second" may be reversed without changing the scope of the invention. That is, an element termed a "first" element (e.g., a first pair of opposing electrodes 202*a-b*, a first polarity configuration, etc.) may instead be termed a "second" element (e.g., a second pair of opposing electrodes 202*c-d*, a second polarity configuration, etc.) and an element termed a "second" element (e.g., a second pair of opposing electrodes 202*c-d*, a second polarity configuration, etc.) may instead be considered a "first" element (e.g. a first pair of opposing electrodes 202*a-b*, a first polarity configuration, etc.).

Any steps described in this specification may be performed in any order or simultaneously unless stated or the context requires otherwise. Moreover, where a step is described as being performed after a step, this does not preclude intervening steps being performed.

It is also to be understood that, for any given component or embodiment described herein, any of the possible candidates or alternatives listed for that component may generally be used individually or in combination with one another, unless implicitly or explicitly understood or stated otherwise. It will be understood that any list of such candidates or alternatives is merely illustrative, not limiting, unless implicitly or explicitly understood or stated otherwise.

In this detailed description of the various embodiments, for the purposes of explanation, numerous specific details are set forth to provide a thorough understanding of the embodiments disclosed. One skilled in the art will appreciate, however, that these various embodiments may be practiced with or without these specific details. Furthermore, one skilled in the art can readily appreciate that the specific sequences in which methods are presented and performed are illustrative and it is contemplated that the sequences can be varied and still remain within the scope of the various embodiments disclosed herein.

All literature and similar materials cited in this application, including but not limited to patents, patent applications, articles, books, treatises and internet web pages are expressly incorporated by reference in their entirety for any purpose. Unless otherwise described, all technical and scientific terms used herein have a meaning as is commonly understood by one of ordinary skill in the art to which the various embodiments described herein belongs.

The invention claimed is:

1. A method of operating a multipole device comprising a first pair of opposing electrodes and a second pair of opposing electrodes, the method comprising:

sorting a list of mass-to-charge ratios that are assigned to one of a first polarity configuration and a second polarity configuration by an assigned polarity configuration, the first polarity configuration being a configuration in which a first polarity DC offset is applied between the first and second pairs of opposing electrodes, and the second polarity configuration being a configuration in which a second, opposite polarity DC offset is applied between the first and second pairs of opposing electrodes; and based on the sorting, operating the multipole device for a first time duration according to the first polarity configuration to select ions having mass-to-charge ratios from the list that are assigned to the first polarity configuration and operating the multipole device for a second time duration, distinct from the first time duration, according to the second polarity configuration to select ions having mass-to-charge ratios from the list that are assigned to the second polarity configuration.

2. The method of claim 1, further comprising operating the multipole device to select ions for each mass-to-charge ratio from the list that are assigned to the first polarity configuration and operating the multipole device to select ions for each mass-to-charge ratio from the list that are assigned to the second polarity configuration.

3. The method of claim 1, wherein the first time duration is prior to the second time duration.

4. The method of claim 1, wherein the sorting comprises sorting the list into a first sub-list comprising a list of mass-to-charge ratios that are assigned to the first polarity configuration and a second sub-list comprising a list of mass-to-charge ratios that are assigned to the second polarity configuration.

5. The method of claim 1, wherein the operating comprises selecting ions having the mass-to-charge ratios that are assigned to one of the first and second polarity configurations in order of low to high mass-to-charge ratio and selecting ions having the mass-to-charge ratios that are assigned to the other one of the first and second polarity configurations in order of high to low mass-to-charge ratio.

6. The method of claim 1, wherein the operating comprises selecting ions in order of low to high mass-to-charge ratio for each of the first and second polarity configurations.

7. The method of claim 1, further comprising pre-accumulating ions in an ion store whilst varying the DC offset applied between the first and second pairs of opposing electrodes.

8. The method of claim 7, wherein the varying comprises varying the DC offset to transition between the first and second polarity configurations.

9. The method of claim 1, further comprising adjusting a signal measurement detected by a detector based on the operating polarity configuration.

10. The method of claim 9, wherein the adjusting comprises adjusting the signal measurement to at least partially compensate for a difference in an amount of ions transmitted by the multipole device when operating according to the first polarity configuration compared to the second polarity configuration.

11. The method of claim 10, wherein the adjusting comprises adjusting the signal measurement when the difference is greater than a non-zero threshold amount.

12. The method of claim 10, wherein the adjusting comprises adjusting the signal measurement based on one or more adjustment coefficients that are established by:

determining amounts of ions transmitted when operating according to each of the first and second polarity configurations; and calculating, based on the amounts of ions, the one or more adjustment coefficients.

13. The method of claim 12, wherein the determining the amounts of ions transmitted comprises determining a relative transmission factor or difference between the first and second polarity configurations.

14. The method of claim 12, wherein the one or more adjustment coefficients comprise one or more mass-to-charge ratio dependent adjustment coefficients.

15. The method of claim 12, further comprising determining an ion accumulation time for automatic gain control based on the one or more adjustment coefficients.

16. The method of claim 12, wherein the determining the amounts of ions transmitted comprises controlling the multipole device to operate according to one of the first and second polarity configurations to select ions having one or more mass-to-charge ratios from the list that are assigned to the one of the first and second polarity configurations and controlling the multipole device to operate according to the other one of the first and second polarity configurations to select ions having the one or more mass-to-charge ratios from the list that are assigned to the one of the first and second polarity configurations.

17. The method of claim 16, wherein the calculating comprises calculating the one or more adjustment coefficients based on a difference in area of the signal measurement when controlling the multipole device to operate according to the first and second polarity configurations for the one or more mass-to-charge ratios from the list that are assigned to the one of the first and second polarity configurations.

18. The method of claim 16, wherein controlling the multipole device to operate according to the other one of the first and second polarity configurations occurs directly after controlling the multipole device to operate according to the one of the first and second polarity configurations.

19. The method of claim 1, wherein one or both of the first and second pairs of opposing electrodes are hyperbolic or cylindrical rod electrodes.

20. The method of claim 1, wherein the multipole device is a quadrupole device and/or the multipole device is a mass filter.

21. The method of any claim 1, wherein the multipole device is arranged upstream of a collision cell and the collision cell is arranged upstream of a mass analyser.

22. The method of claim 1, wherein each of the mass-to-charge ratios in the list is greater than a threshold mass-to-charge ratio value and/or wherein each pair of mass-to-charge ratios assigned to the first polarity configuration and/or each pair of mass-to-charge ratios assigned to the second polarity configuration differs by less than a maximum amount.

23. The method of claim 22, wherein the threshold mass-to-charge ratio value and/or the maximum amount is selected or determined based on a time period to switch operation of the multipole device between the first polarity configuration and the second polarity configuration.

24. A controller configured to operate an analytical instrument comprising a multipole device in accordance with the method of claim 1.

25. A system comprising:

an analytical instrument comprising a multipole device; and the controller of claim 24.

26. A computer readable medium having stored thereon instructions which, when executed by a computer, cause the computer to carry out the method of claim 1.

* * * * *